H. M. BROWN.
STOPPER MAKING MACHINE.
APPLICATION FILED SEPT. 19, 1911.
1,039,643.
Patented Sept. 24, 1912.
20 SHEETS—SHEET 5.
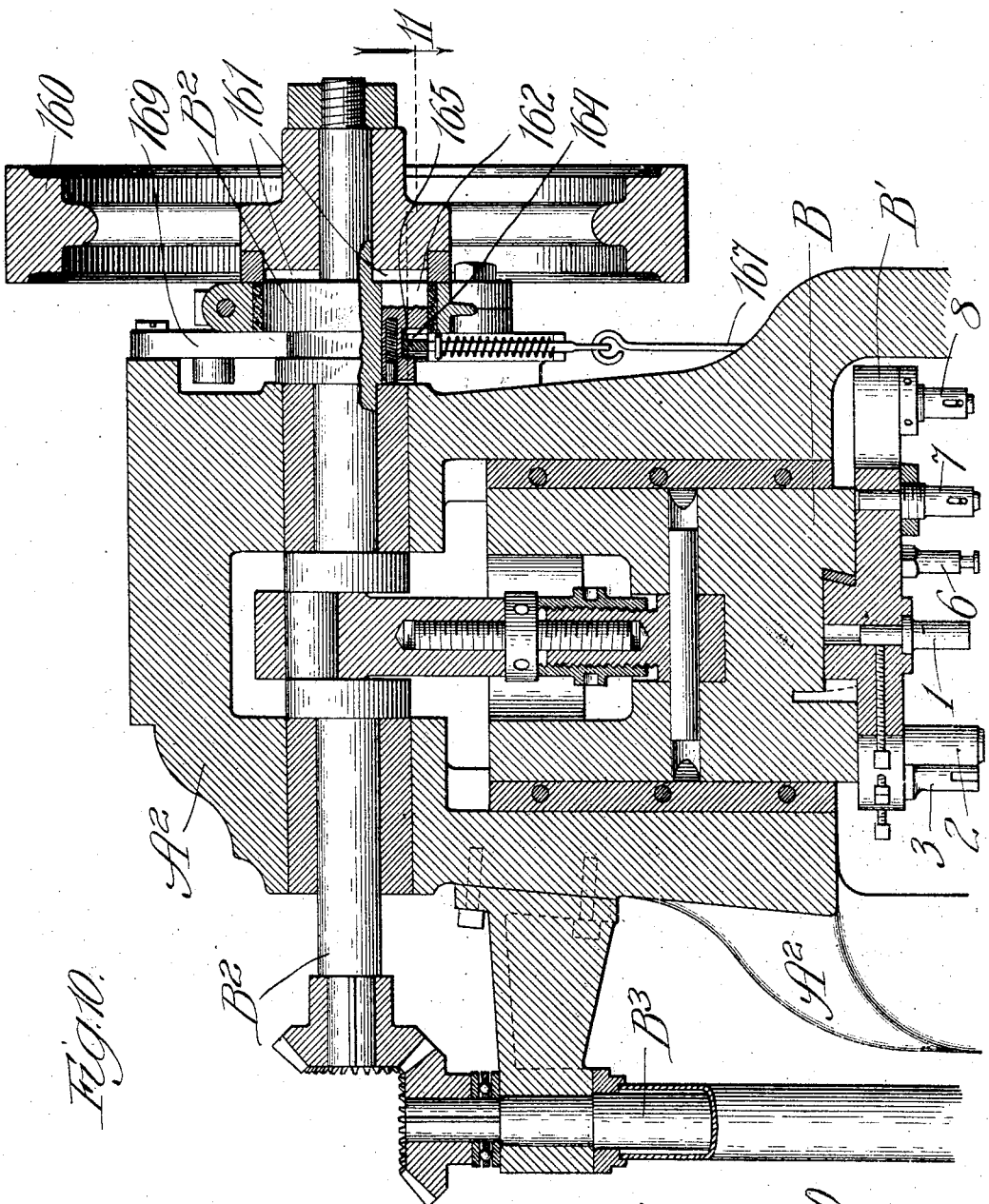
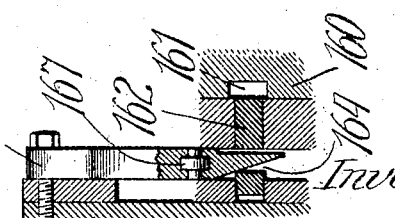
Witnesses:
Inventor:
Harry M. Brown,

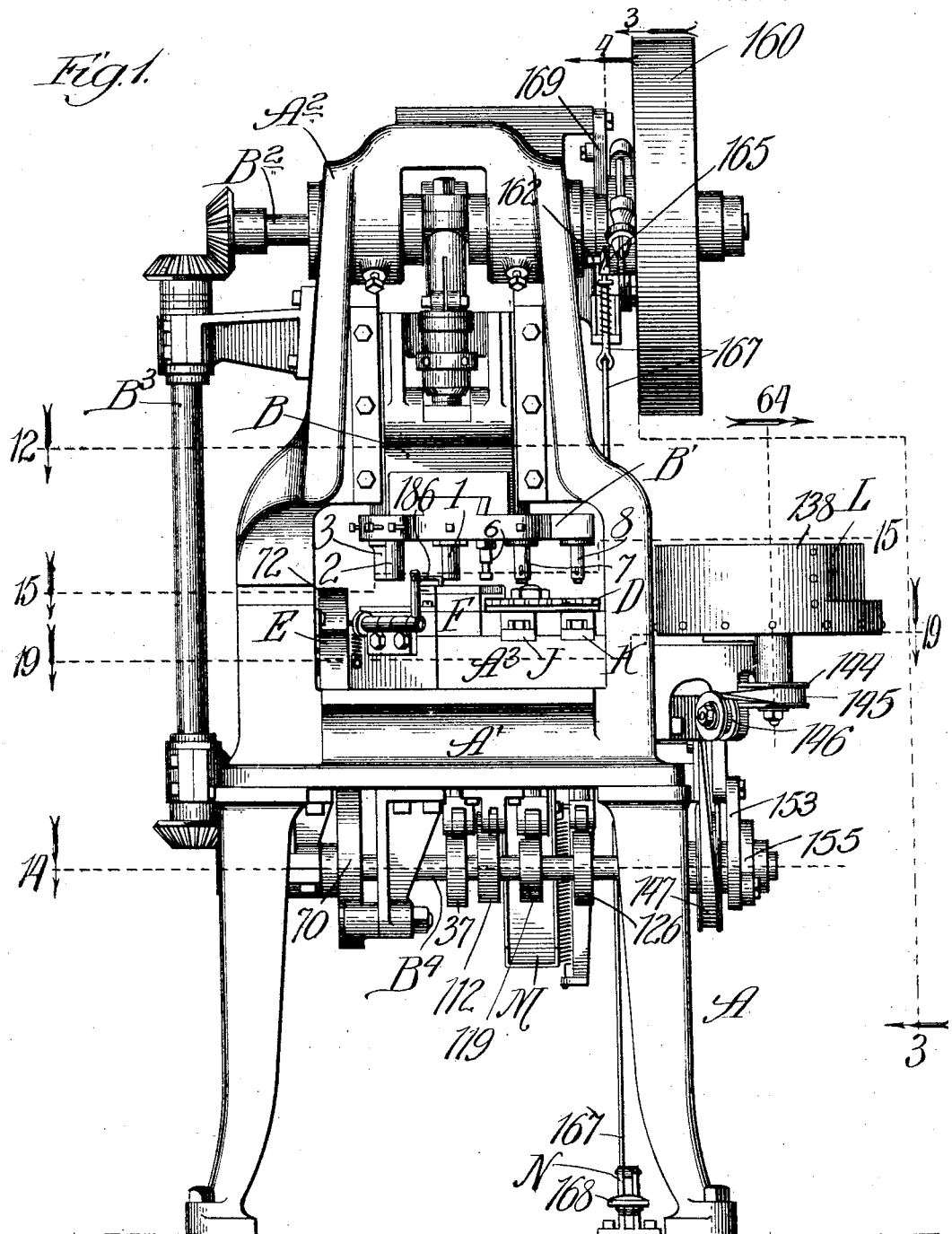

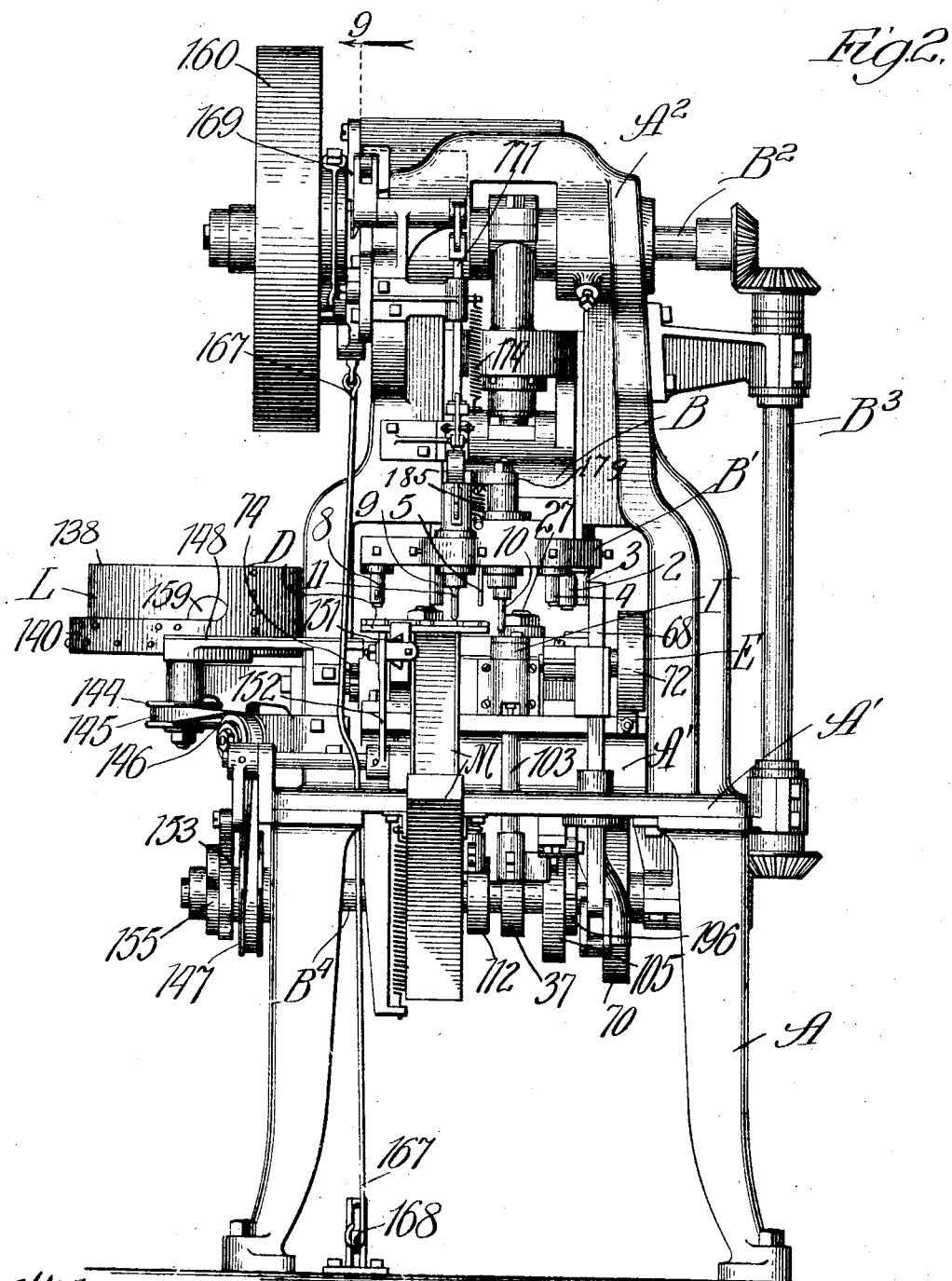

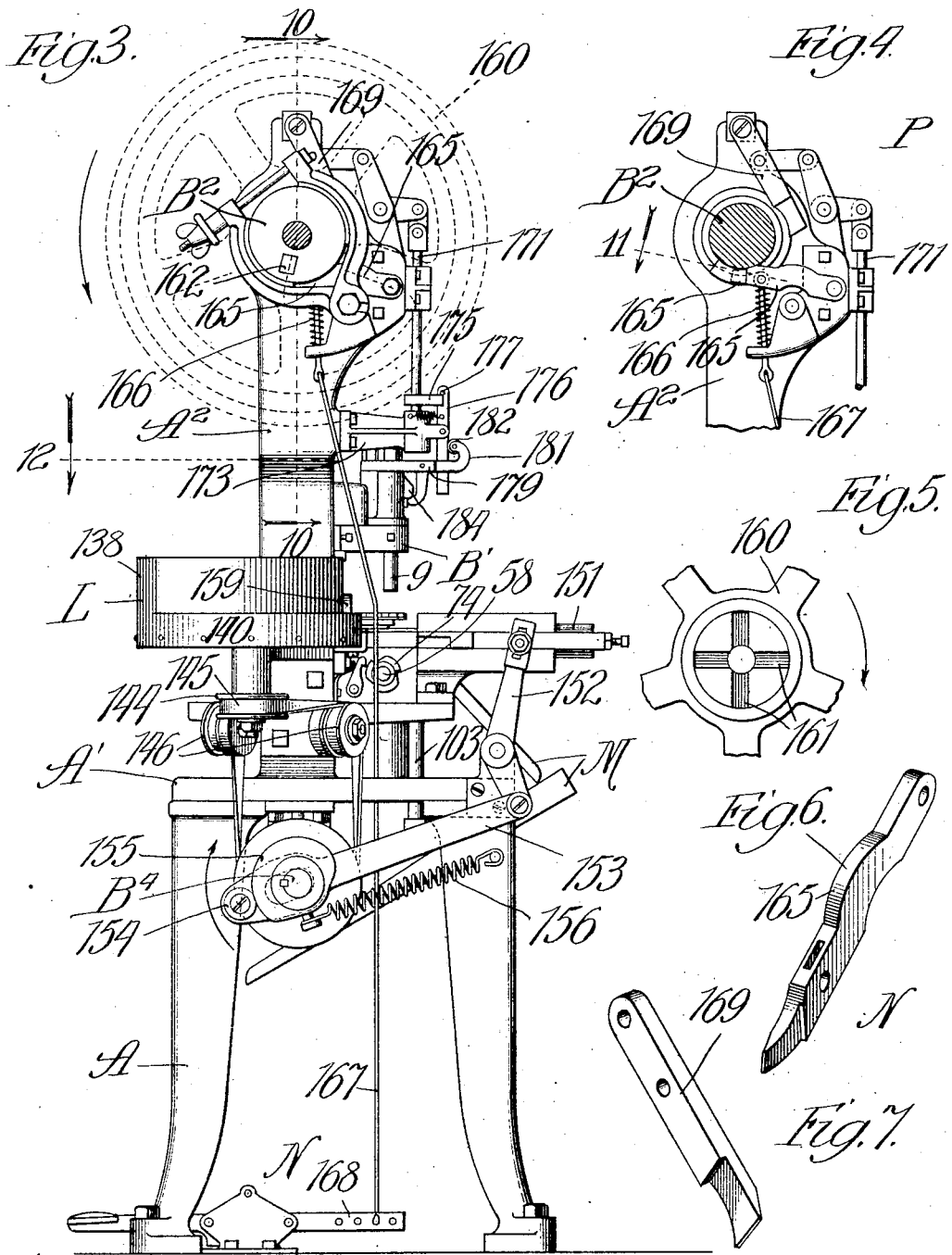

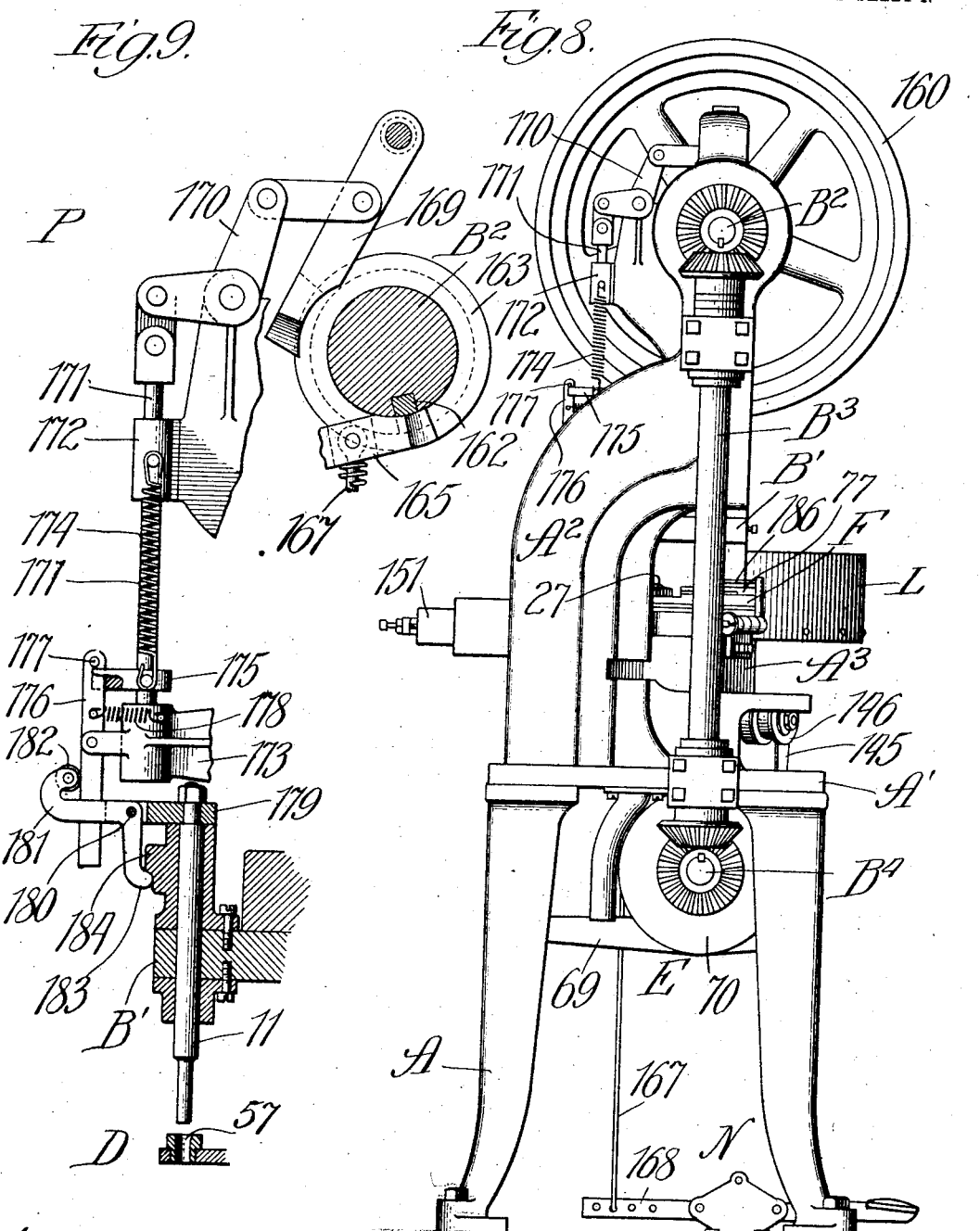

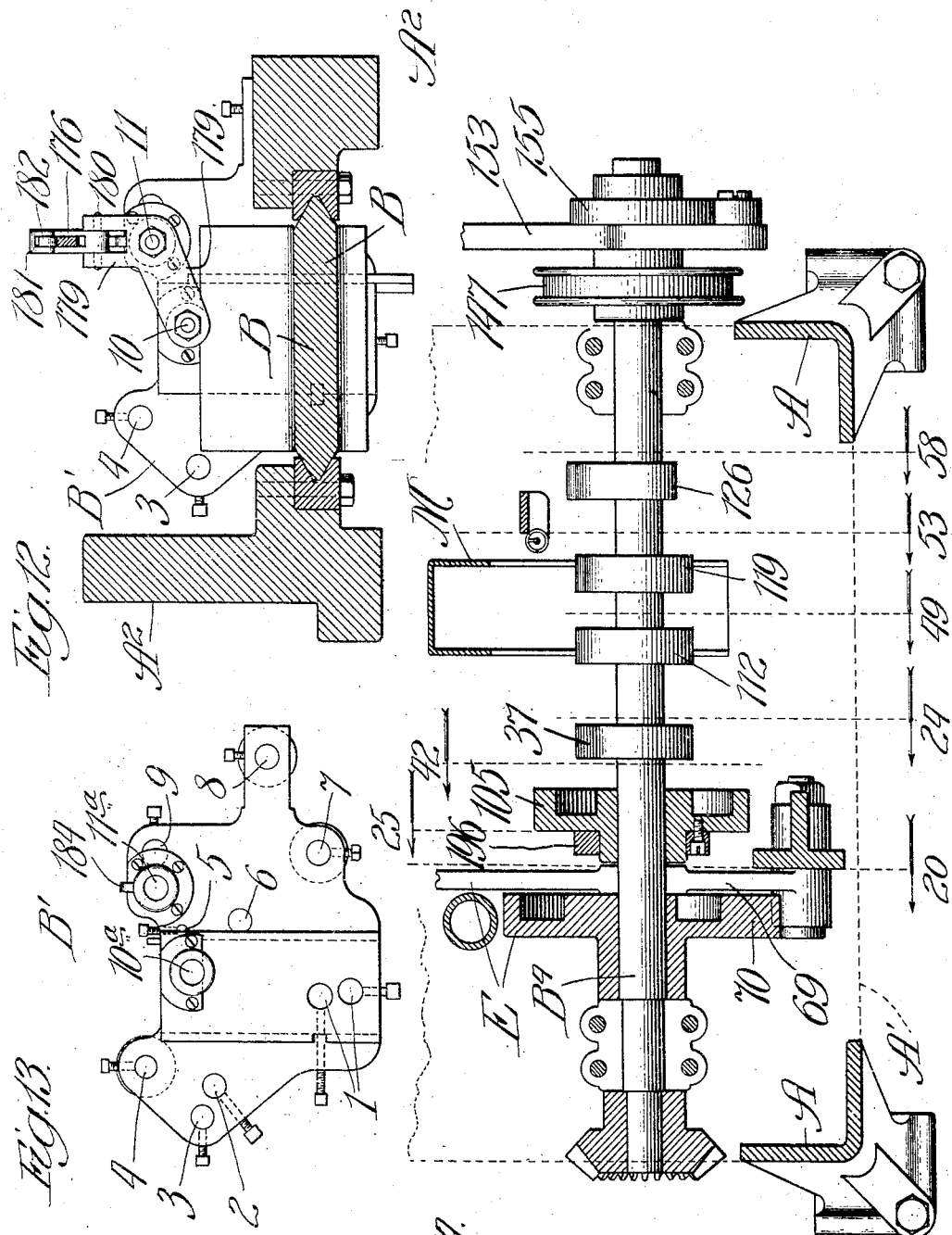

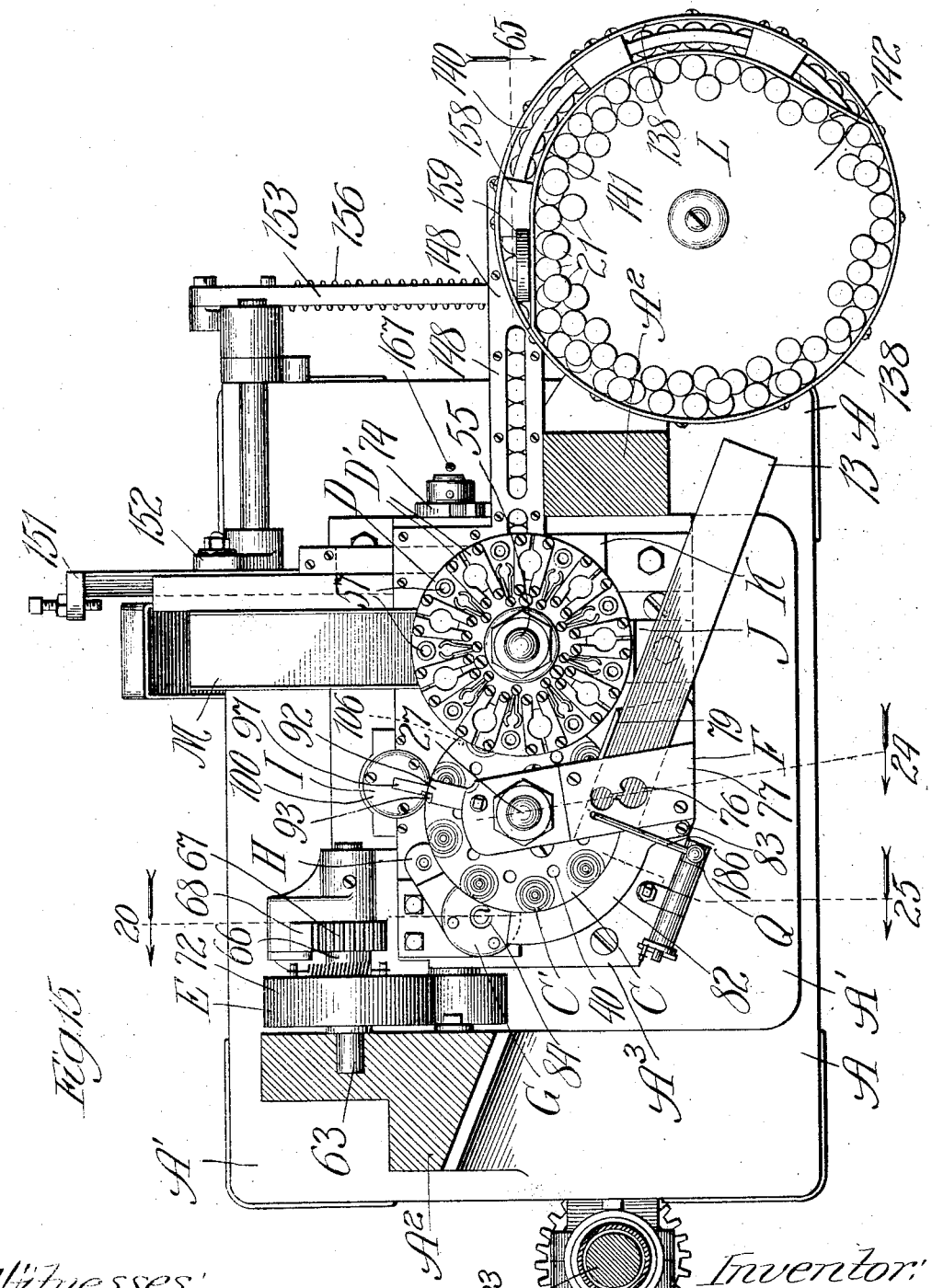

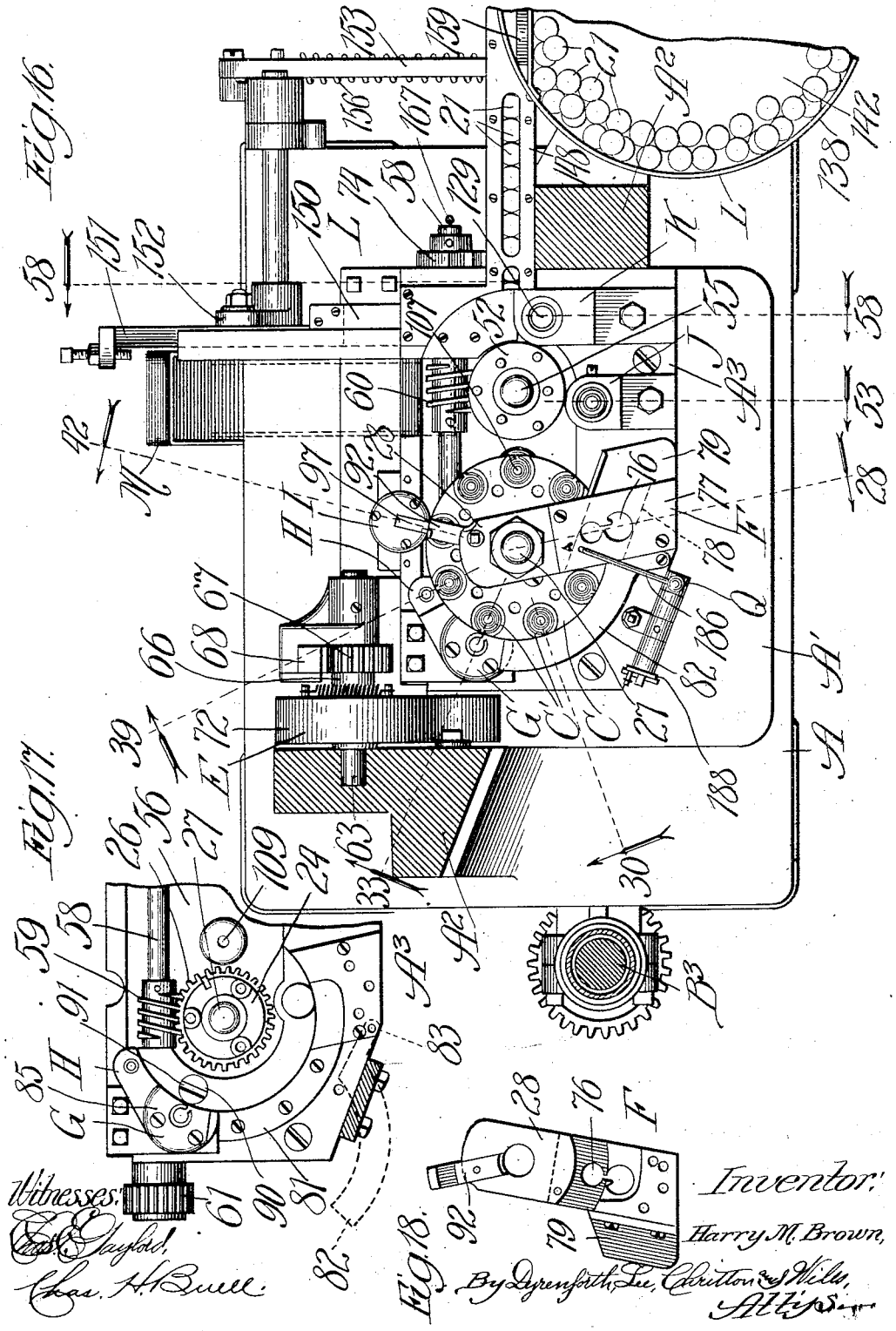

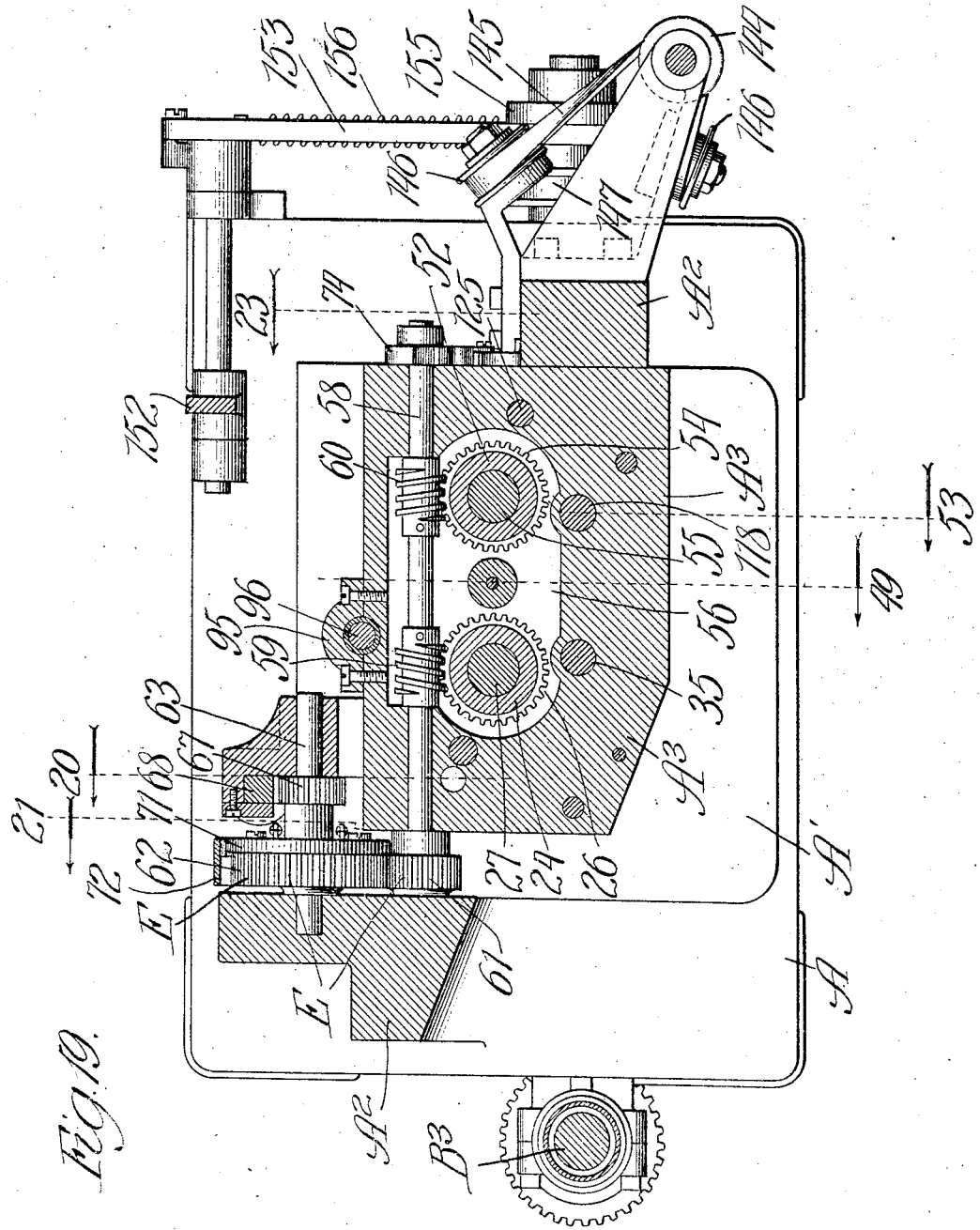

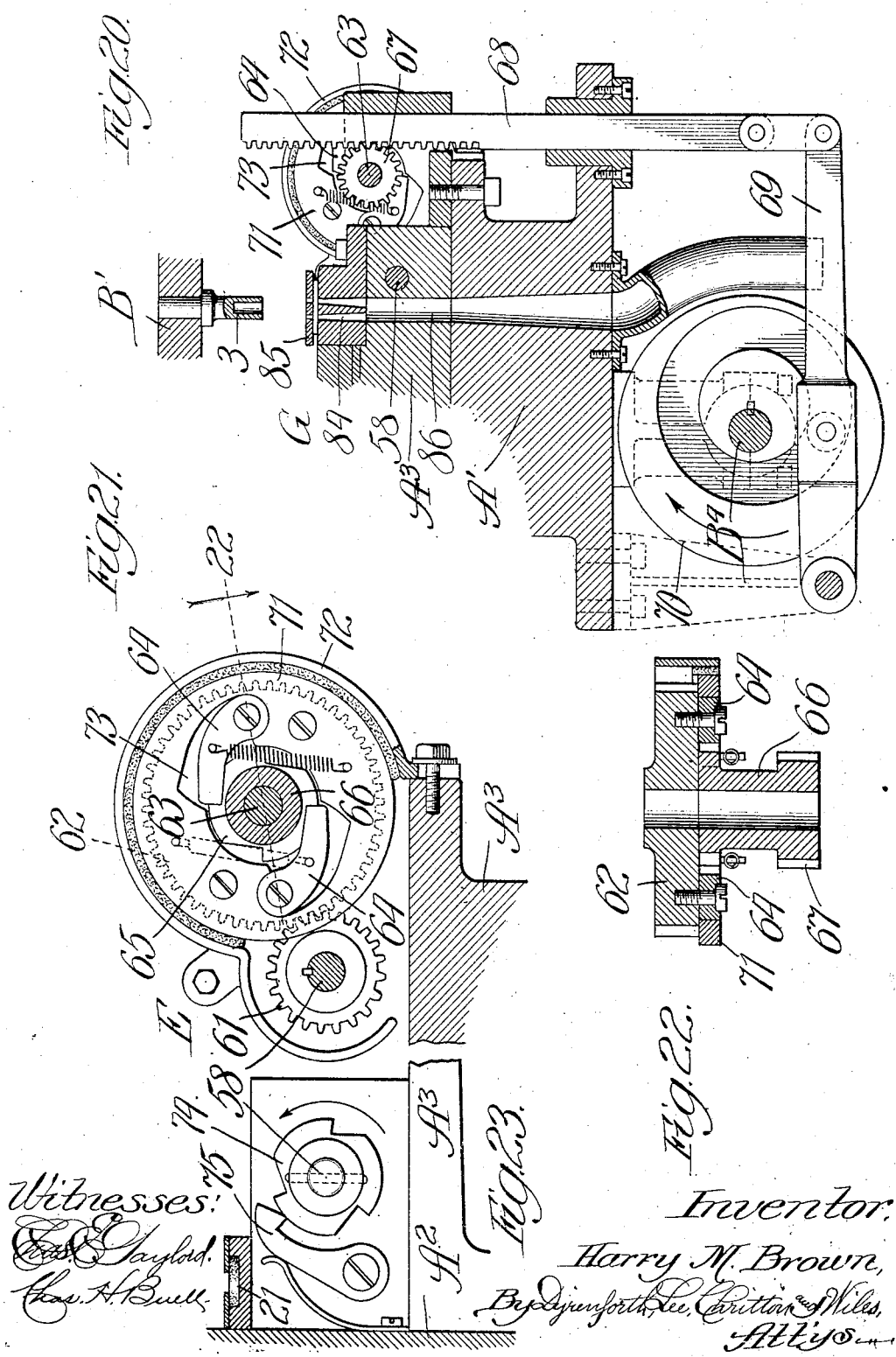

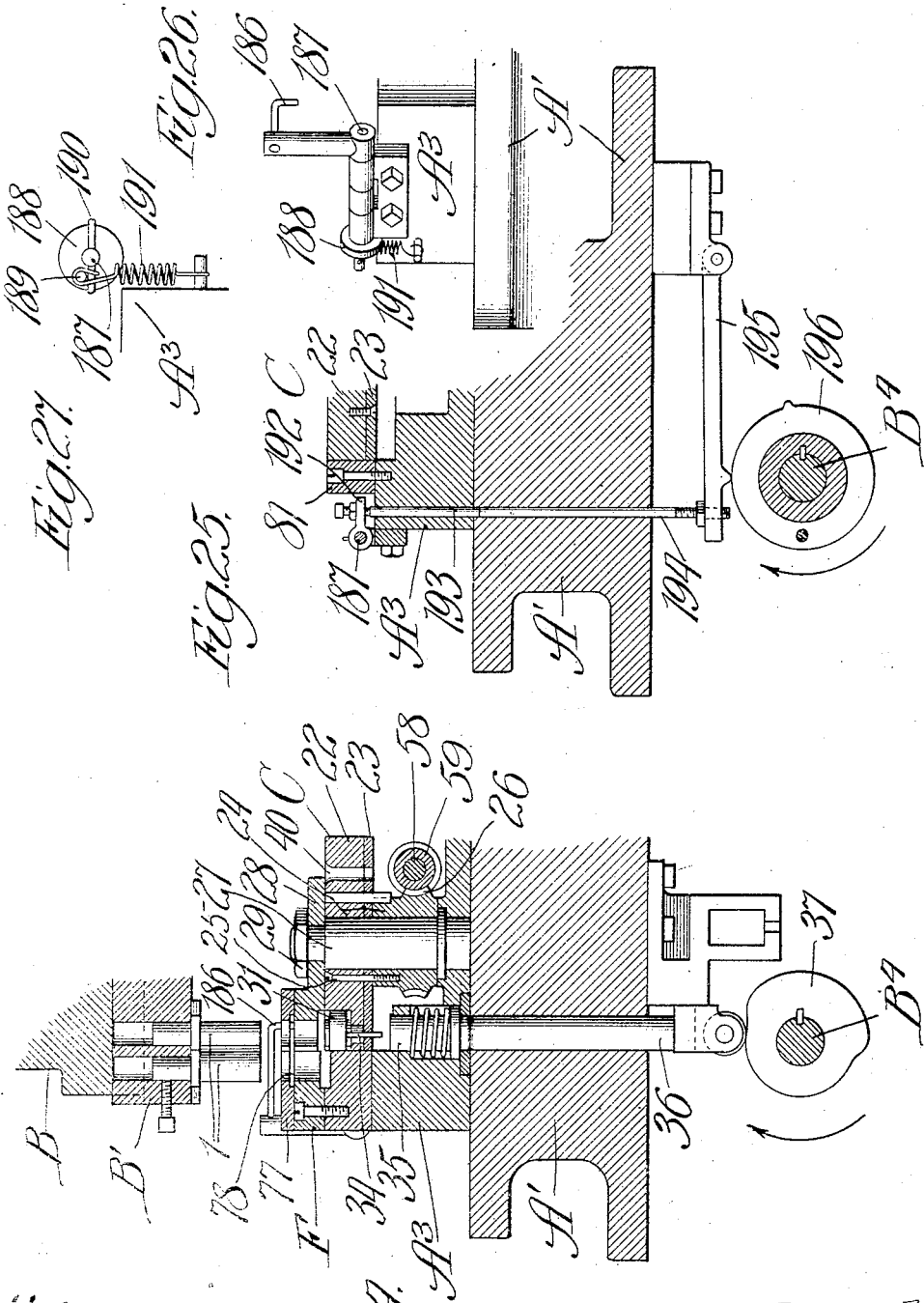

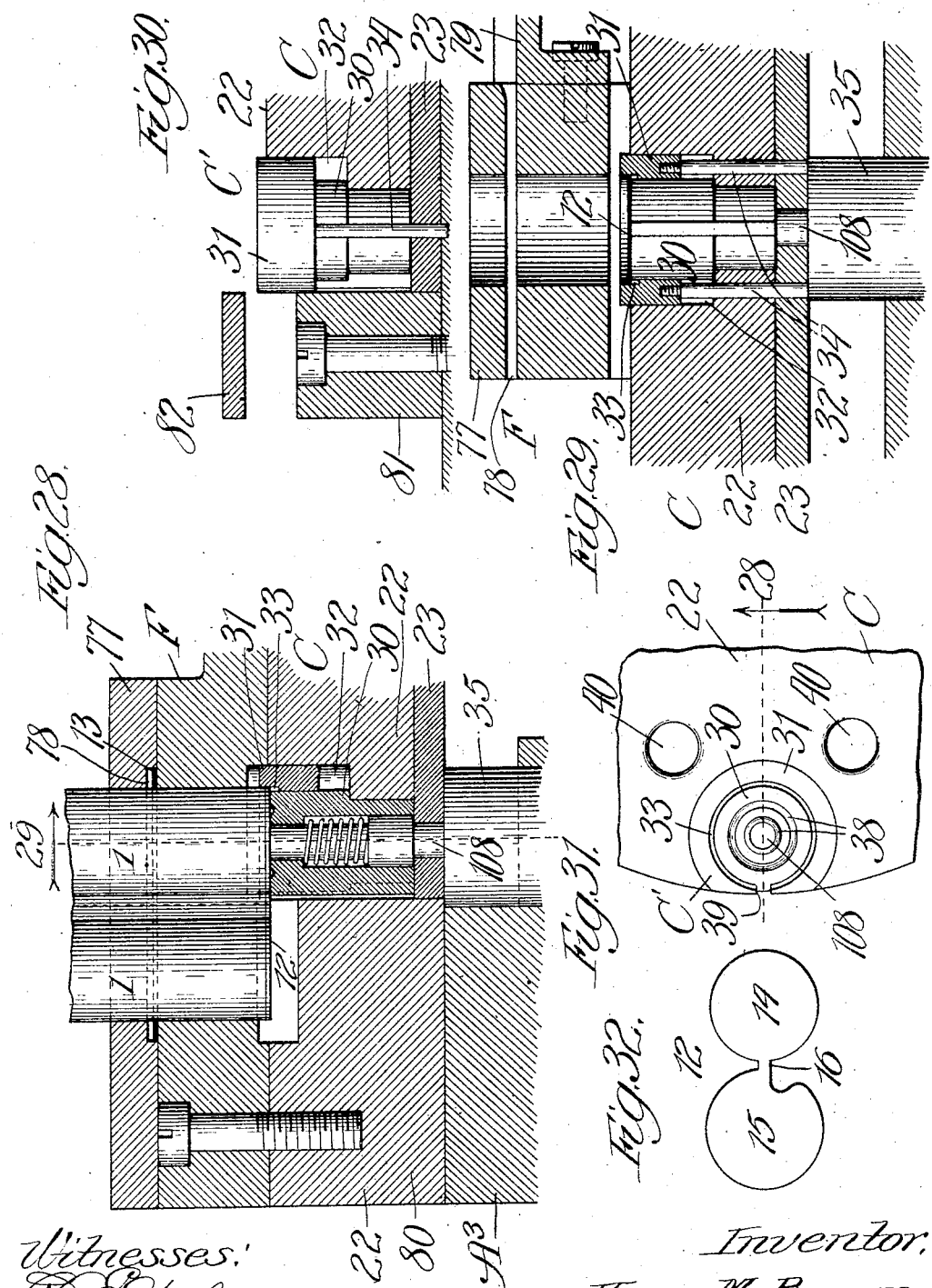

H. M. BROWN.
STOPPER MAKING MACHINE.
APPLICATION FILED SEPT. 19, 1911.
1,039,643.
Patented Sept. 24, 1912.
20 SHEETS—SHEET 13.
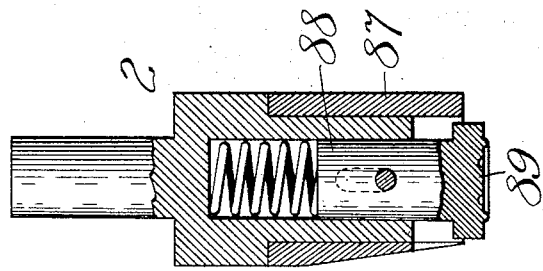
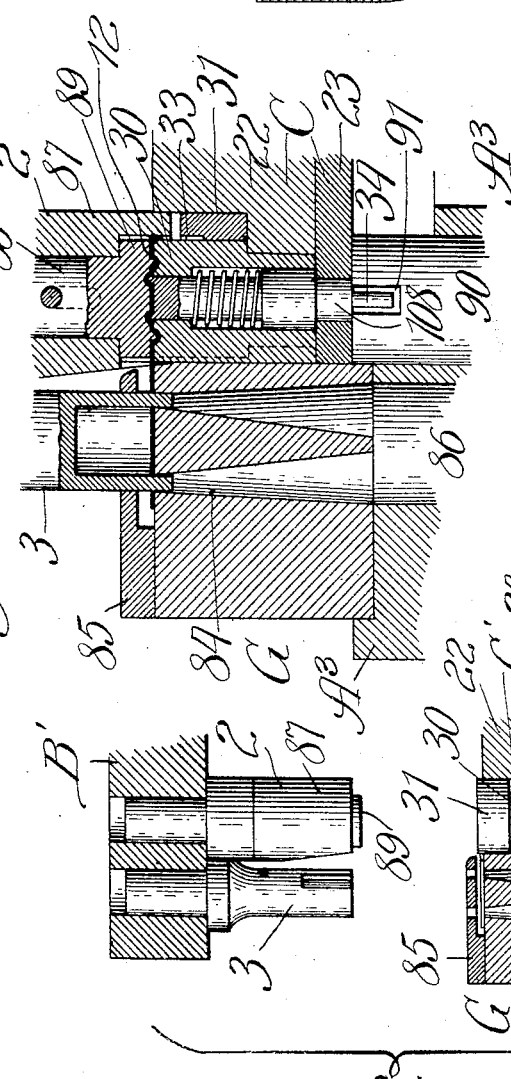

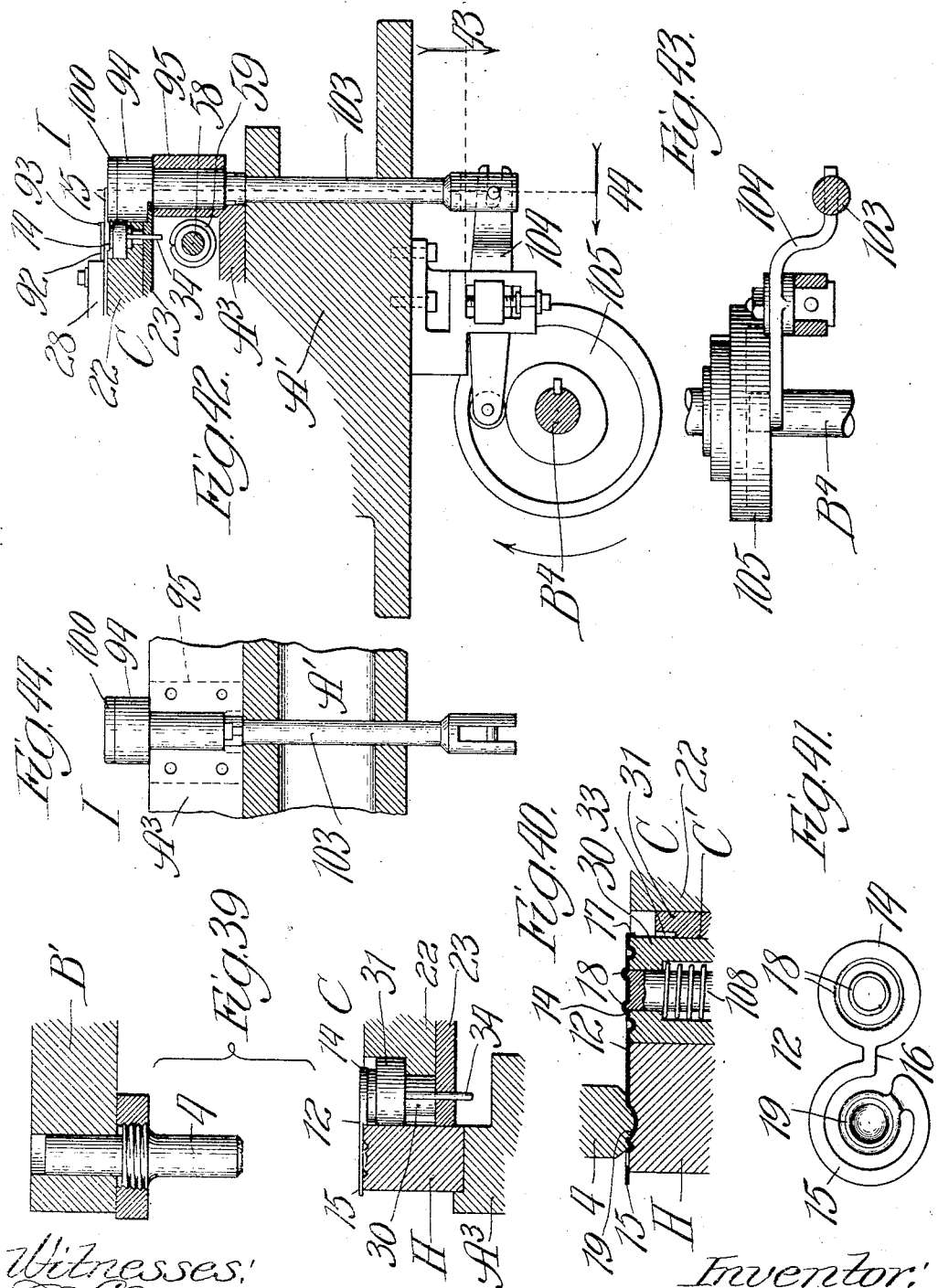

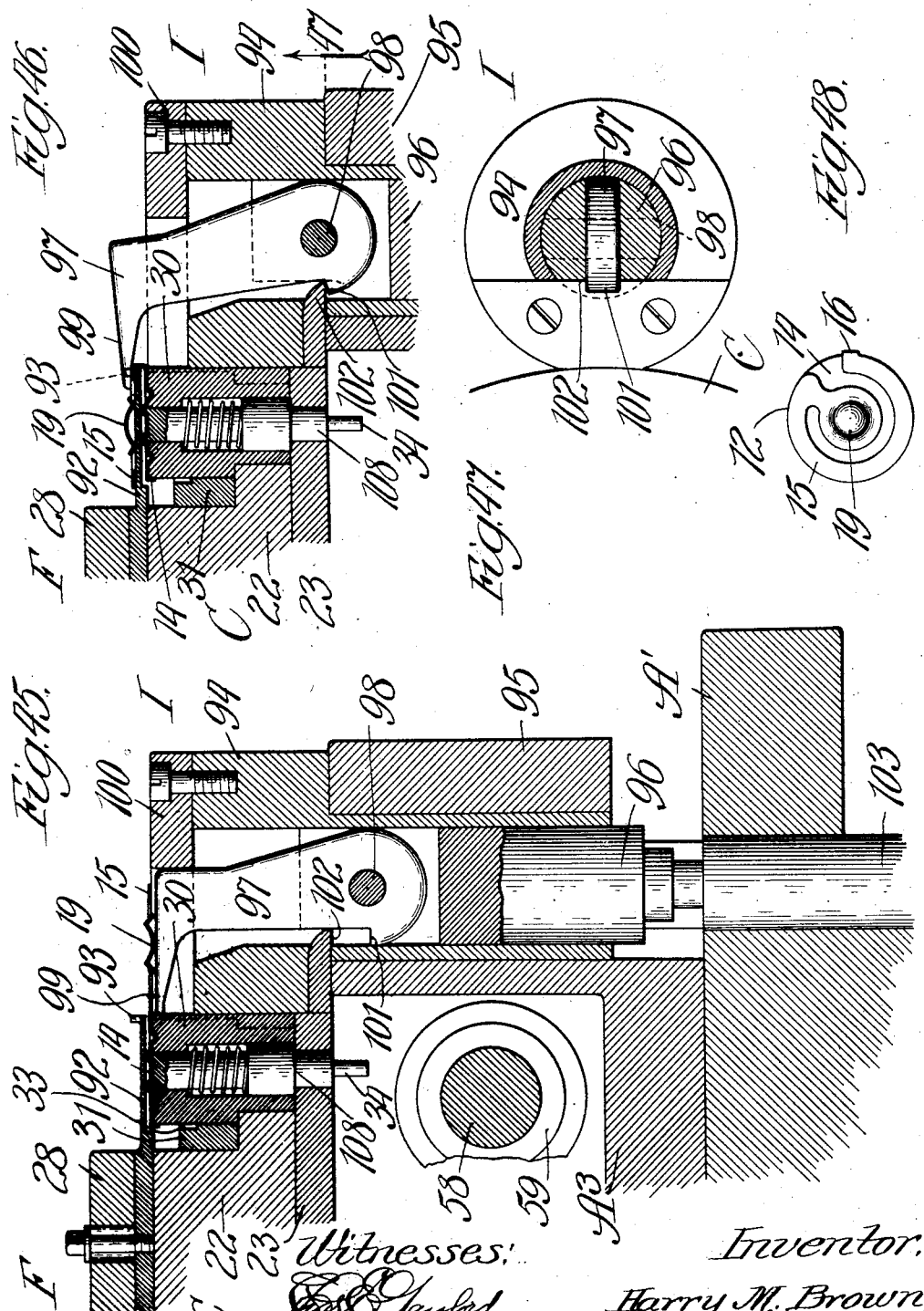

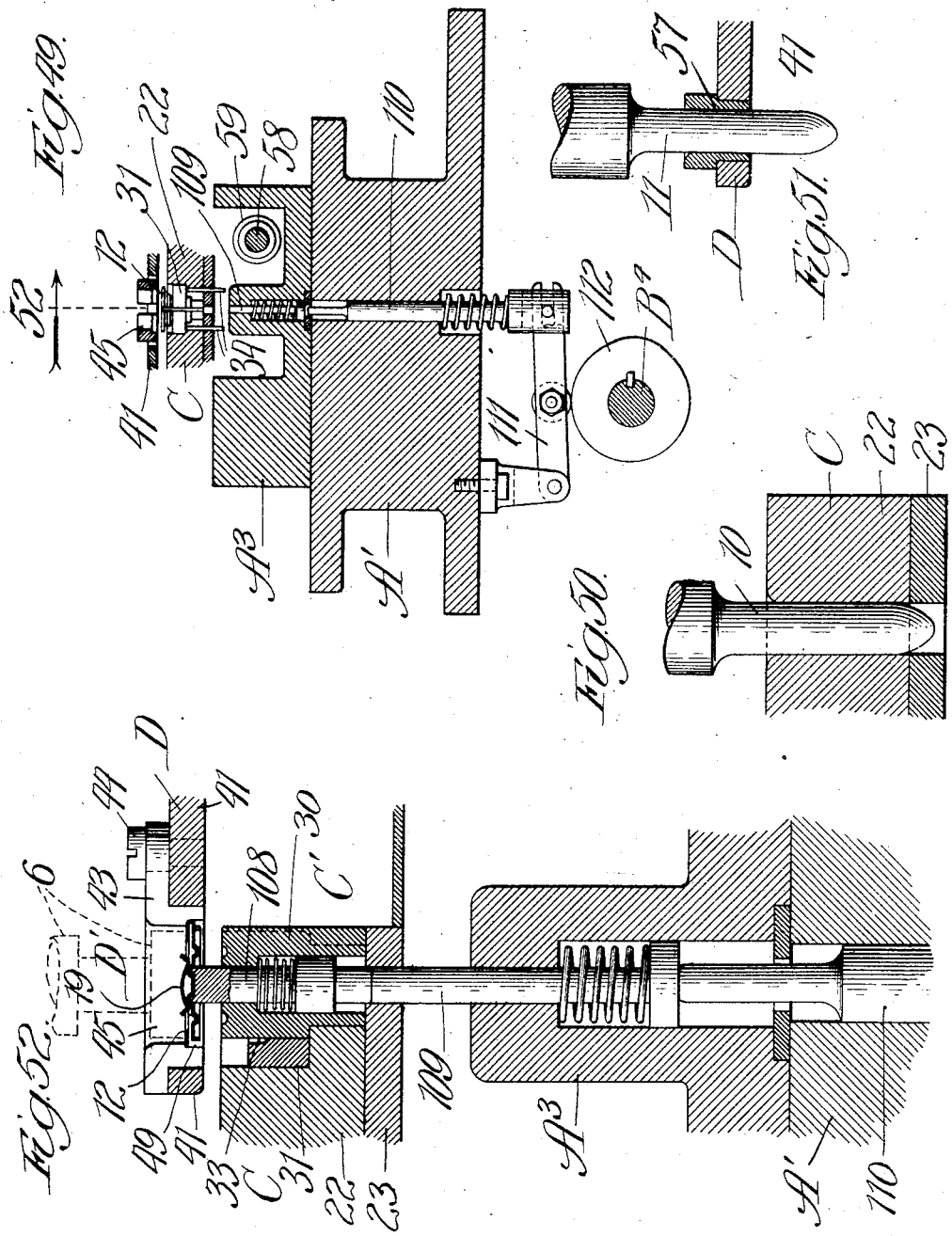

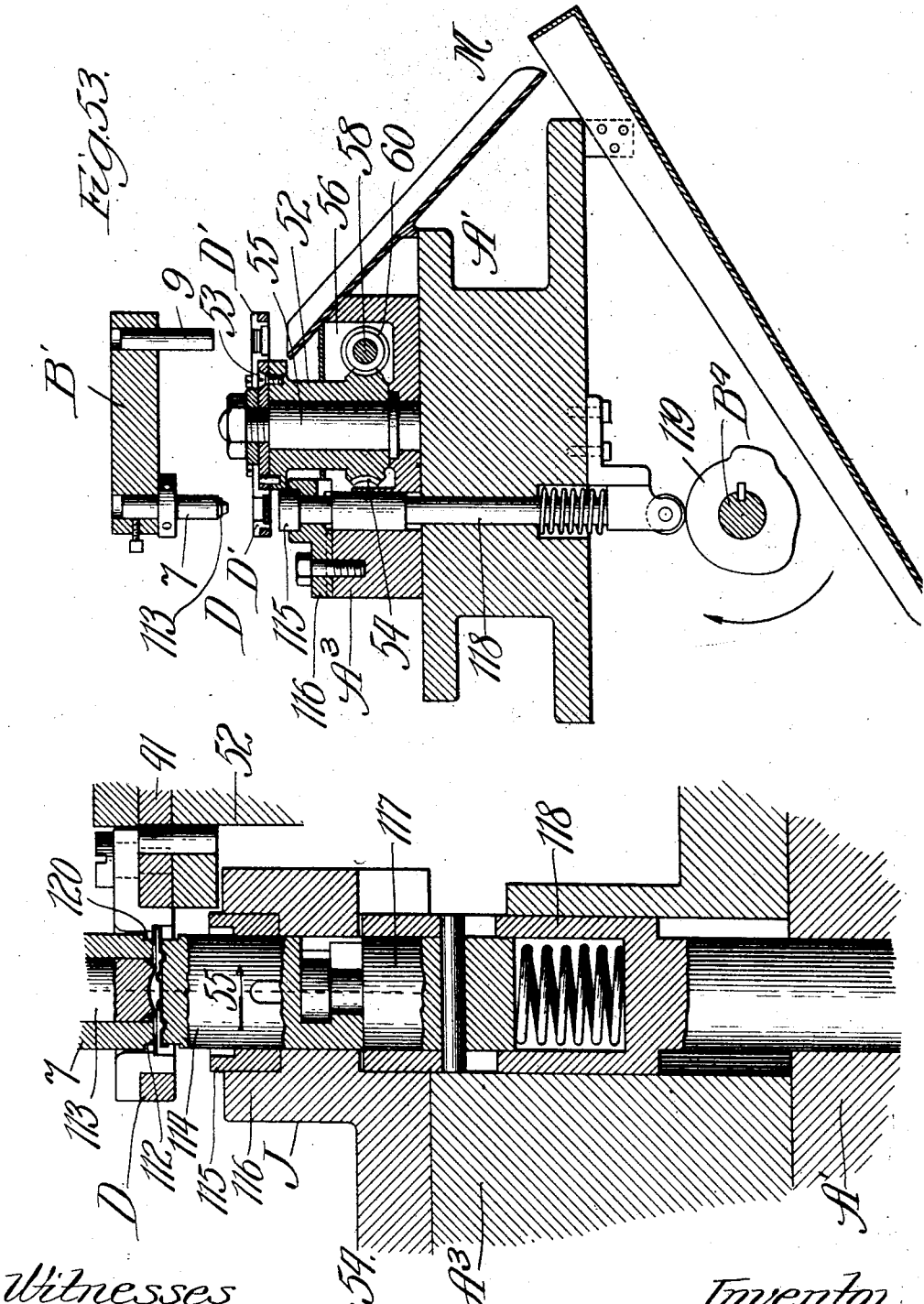

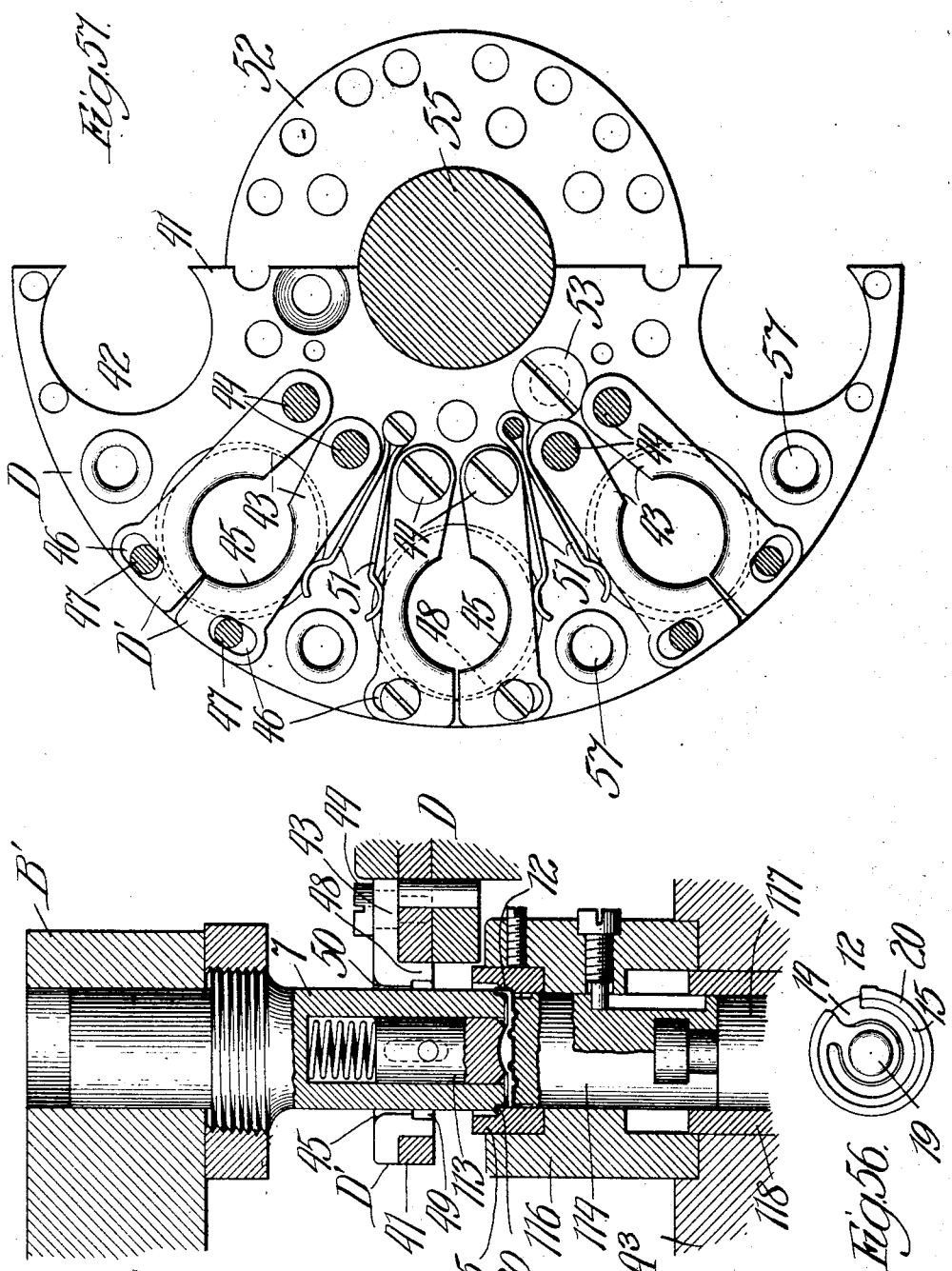

H. M. BROWN.
STOPPER MAKING MACHINE.
APPLICATION FILED SEPT. 19, 1911.
1,039,643.
Patented Sept. 24, 1912.
20 SHEETS—SHEET 19.
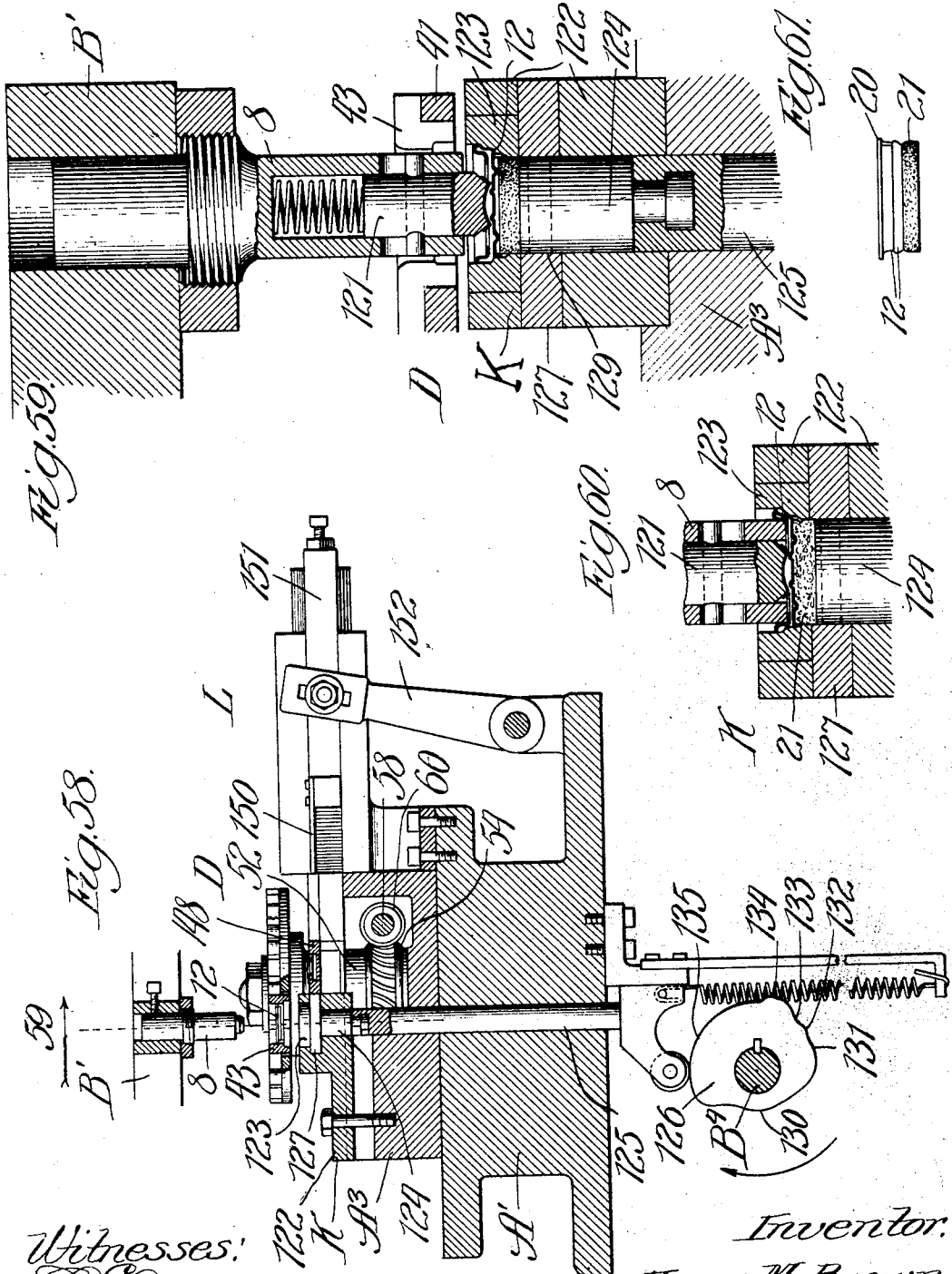

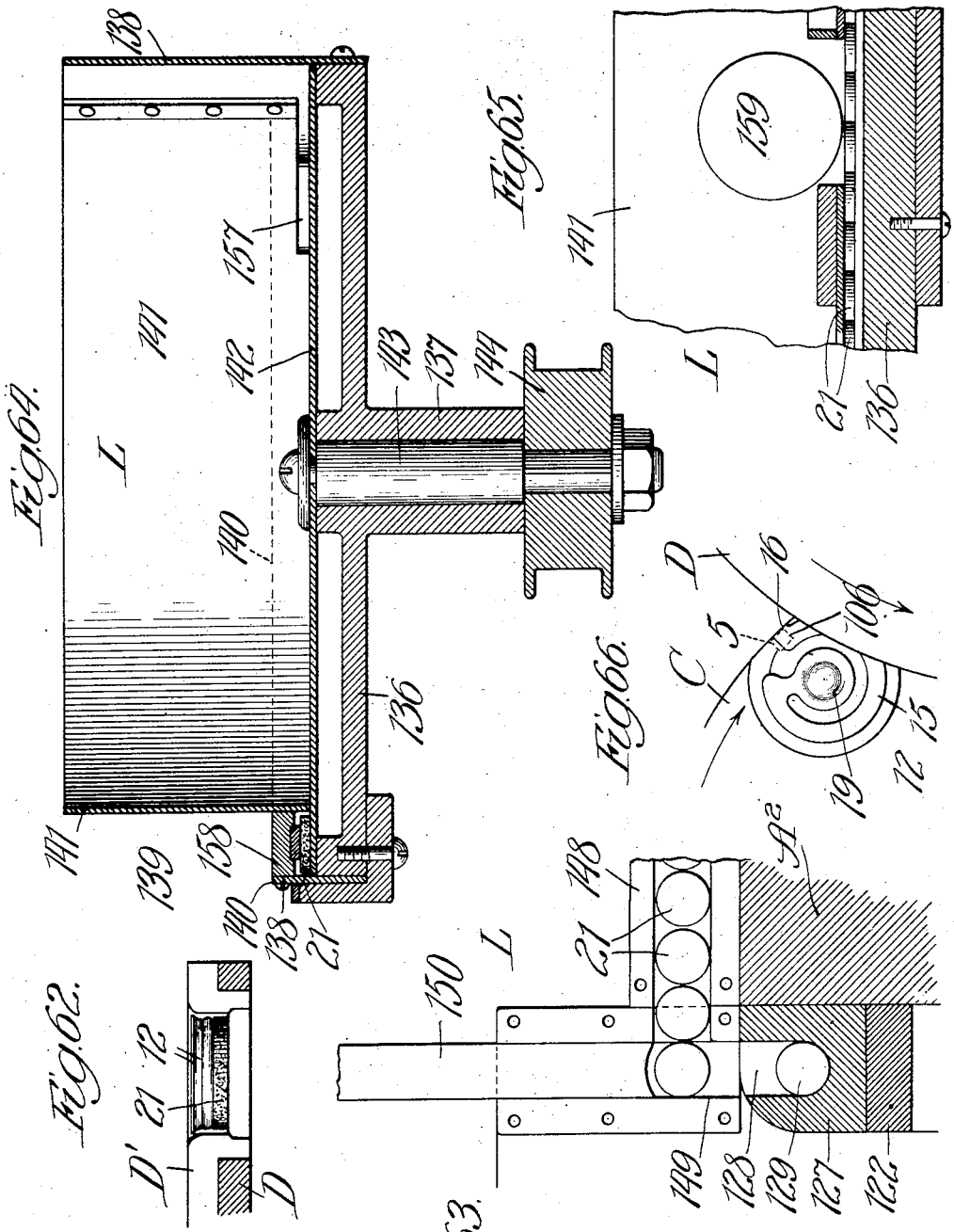

UNITED STATES PATENT OFFICE.

HARRY MELVILLE BROWN, OF BROOKLYN, NEW YORK, ASSIGNOR TO RICHARD A. CANFIELD, OF PROVIDENCE, RHODE ISLAND.

STOPPER-MAKING MACHINE.

1,039,643.          Specification of Letters Patent.      Patented Sept. 24, 1912.

Application filed September 19, 1911. Serial No. 650,296.

*To all whom it may concern:*

Be it known that I, HARRY MELVILLE BROWN, a citizen of the United States, residing at Brooklyn, in the county of Kings and State of New York, have invented a new and useful Improvement in Stopper-Making Machines, of which the following is a specification.

This invention relates to the manufacture of a bottle-stopper, or bottle seal, comprising a metal cap carrying a sealing-disk, such as a cork disk, and surmounted by a locking-ring, or retainer-ring. The cap-disk has a down-turned flange which is clenched on the cork-disk; and a retainer-ring, which is connected with the cap by a web, and has an upturned flange adapted to engage an internal groove in a bottle-mouth.

The primary object of the invention is to provide an improved machine adapted to a rapid and economical manufacture of bottle-stoppers of the character described, the machine operating on the rotary dial principle, although certain features of the invention are capable of use in machines of this type.

A machine constructed in accordance with the preferred embodiment of the invention operates as follows: Power is communicated to an upper horizontal cross-head actuating shaft (when the clutch is engaged); is transmitted through a vertical shaft to a lower horizontal cam-shaft; is transmitted from the cam-shaft to the rotary disk of a centrifugal-feed cork-supplying device; and is also transmitted from the cam-shaft periodically to the mechanism which actuates the main rotary die plate and supplemental rotary carrier to which the blanks are transferred from the annularly moving dies. The cross-head carries all the punches or upper dies and also carries locking-bolts for the main rotary die and rotary carrier. The primary rotary die-plate, or disk, moves in a step-by-step movement, and a strip of sheet metal is fed through a guide over a stationary blanking-die and beneath a stripper; the blank is forced through said die and into one of a series of annularly arranged dies carried by the rotary die-plate (nine of such dies being shown). The blanking-dies operate to produce a pair of web-connected disks, as shown in Fig. 32. When the blank is punched, the cap-disk is forced into a holder-sleeve which is elevated immediately after the die-plate stops with one of its dies located beneath the blanking-die. The cap-disk then rests upon the lower cap-flanging and beading die and is encircled by the holder-sleeve mentioned, while the retainer-ring disk projects radially beyond the circular die-plate. Thus the ring-disk is carried over a stationary piercing-die and beneath the stripper thereof, where the ring-piercing and cap-flanging and cap-beading are done. The die-plate then advances another step, carrying the tab, or finger-piece, of the blank (see Fig. 25) over a stationary lower die or anvil, where the tab-beading operation is performed. The cap still remains on the lower cap-flanging and beading die, the tubular holder having fallen in the meantime, and the die-plate advances a couple of steps farther, carrying the cap beneath a stationary anvil, while the retainer-ring projects over a folder mechanism mounted on the die bed. Here the folder mechanism operates to fold the retainer-ring (by bending the web) over said anvil and into a position surmounting the cap. After another step, a punch operates to strike the web of the folded blank and give to it a set, so that the retainer-ring will rest snugly on the top of the cap.

The secondary rotary disk, or carrier, is disposed in a plane slightly above the main rotary disk and overlaps it somewhat. It is provided with an annular series of perforations, guarded by a pair of spring jaws which operate to hold the blanks after the transfers are successively effected. The transfer occurs when one of the openings of the carrier-plate is directly above one of the dies of the main rotary disk, and is accomplished by means of an upper punch carried by the cross-head and a follower or plunger working through each die of the main rotary disk. After the transfer is effected, the folded blank is carried by a succession of steps to a position above a lower ring-flanging die which is mounted on the bed of the machine, and there a punch operated by the cross-head operates to force the blank into the lower ring-flanging die, and produce an upturned flange on the ring, after which the blank is again elevated to the carrier and carried, by a succession of steps, to the cork-inserting and clenching means. Here the blank is lowered into a lower clenching-die carried by the bed of the machine, and a cork having been introduced an instant before, the cap-flange is clenched on the cork, after which the completed stopper is elevated to the carrier and moved, in a step-by-step movement, to the discharge-chute, where a discharge-punch carried by the cross-head operates to discharge the stopper from the machine.

The invention is illustrated in detail in the accompanying drawings, in which—

Figure 1 represents a front elevational view of the improved machine; Fig. 2, a rear elevational view of the same; Fig. 3, a section taken as indicated at line 3 of Fig. 1 and showing the cross-head actuating-shaft in section and the machine in right side elevation (if one faces the front of the machine); Fig. 4, a broken section taken as indicated at line 4 of Fig. 1 and showing portions of a foot-controlled clutch-releasing dog and an automatically-controlled clutch-releasing dog; Fig. 5, a broken view showing the hub of the drive-wheel, with the clutch-receiving sockets therein; Fig. 6, a perspective view of the treadle-controlled clutch-releasing dog; Fig. 7, a perspective view of the automatically-controlled clutch-releasing dog; Fig. 8, a left-hand view of the machine; Fig. 9, an enlarged broken vertical section taken as indicated at line 9 of Fig. 2, and showing the automatic clutch-releasing mechanism employed; Fig. 10, an enlarged broken vertical section taken as indicated at line 10 of Fig. 3; Fig. 11, a broken plan sectional view taken as indicated at line 11 of Figs. 4 and 10, this view showing also the treadle-controlled clutch-releasing dog; Fig. 12, a section taken as indicated at line 12 of Fig. 1 and showing the guide for the main cross-head; Fig. 13, a plan view of the upper punch-carrying head, or block; Fig. 14, a broken section taken as indicated at line 14 of Fig. 1 and showing the lower or horizontal cam-shaft employed; Fig. 15, a plan section taken as indicated at line 15 of Fig. 1 and showing the main or rotary die-carrying disk, the secondary carrier-disk which overlaps it, and the centrifugal cork-feeding device; Fig. 16, a broken section similar to Fig. 15, but with the secondary disk removed; Fig. 17, a broken plan view showing a portion of the bed and attendant parts; Fig. 18, a bottom view of the lower blanking-dies; Fig. 19, a plan section taken as indicated at line 19 of Fig. 1, this section being through the removable bed-block employed and disclosing the mechanism for operating the main rotary disk and the secondary rotary disk; Fig. 20, a vertical section taken as indicated at line 20 of Figs. 14, 15 and 19, this view disclosing the cam which intermittently actuates the disk-rotating mechanism; Fig. 21, an enlarged section taken as indicated at line 21 of Fig. 19; Fig. 22, a plan section taken as indicated at line 22 of Fig. 21; Fig. 23, a view in elevation showing the shaft-locking means which appears in plan at the right-hand portion of Fig. 19; Fig. 24, a broken vertical section taken as indicated at line 24 of Figs. 14 and 15, and showing, in relation to the main rotary disk, the blanking-dies; Fig. 25, a section taken as indicated at line 25 of Figs. 14 and 15 and showing means for actuating a stop-finger which controls the feed of the sheet metal strip from which the blanks are punched; Fig. 26, a perspective view, showing the stop-finger and attendant parts; Fig. 27, a view in end elevation of the mechanism shown in Fig. 26; Fig. 28, an enlarged broken vertical section taken as indicated at the corresponding lines 28 of Figs. 16 and 31, this view showing how the blank, after punching, is lowered so that the cap-disk of the blank will rest upon one of the cap-flanging dies of the main rotary disk and held by an encircling sleeve, which at this time is elevated; Fig. 29, a section taken as indicated at line 29 of Fig. 28, the blanking-punches not being shown, however; Fig. 30, a broken section taken as indicated at line 30 of Fig. 16 and showing the devices which appear in the lower portion of Fig. 29; Fig. 31, a broken plan view, showing a fragment of the main rotary disk and one of the annularly arranged dies carried thereby; Fig. 32, a blank produced by the dies shown in Fig. 28; Fig. 33, a section taken as indicated at line 33 of Fig. 16, this view showing the piercing dies and cap-flanging and beading dies; Fig. 34, a view showing the ring-piercing and cap-flanging and beading operations; Fig. 35, a plan view of the blank produced by the dies shown in Fig. 34; Fig. 36, a section taken as indicated at line 36 of Fig. 35; Fig. 37, a sectional view of the upper cap-flanging and beading die, or punch; Fig. 38, a view of an anvil which is located adjacent to the lower ring-piercing die and adapted to support the peripheral portion of the main rotary disk, as shown in Fig. 34, when the cap-flanging and beading operations is performed; Fig. 39, a broken sectional view taken as indicated at line 39 of Fig. 16, this view showing the stationary lower tab-beading die and the co-acting upper punch; Fig. 40, a view showing the operation of these dies; Fig. 41, a view of the blank after operation of the dies shown in Figs. 39 and 40; Fig. 42, a section taken as indicated at line 42 of Figs. 14 and 16, this view showing the folder mechanism mounted on the bed adjacent the periphery of the main rotary disk; Fig. 43, a broken plan section taken as indicated at line 43 of Fig. 42; Fig. 44, a section taken as indicated at line 44 of Fig. 42; Fig. 45, an enlarged broken vertical section of the folder mechanism shown in Fig. 42 Fig. 46, a similar section showing the position of the parts immediately after the folding operation; Fig. 47, a sectional view taken as indicated at line 47 of Fig. 46; Fig. 48, a view showing the blank after the retainer-ring has been folded on the cap; Fig. 49, a vertical section taken as indicated at line 49 of Figs. 14 and 19, this section being at the point where the transfer from the main rotary disk to the secondary rotary disk or carrier is effected; Fig. 50, a broken sectional view illustrating means for locking the main rotary disk; Fig. 51, a similar view showing means for locking the secondary rotary disk; Fig. 52, a broken section taken as indicated at line 52 of Fig. 49, but showing the position of the parts after the transfer has been effected, the upper plunger carried by the cross-head being omitted, however; Fig. 53, a section taken as indicated at line 53 of Figs. 14, 16 and 19, this section showing the ring-flanging devices and stopper-discharging devices; Fig. 54, an enlarged broken vertical section showing the ring-flanging dies with an interposed blank, prior to lowering the blank from the secondary disk or carrier to the lower ring-flanging die; Fig. 55, a similar section showing the ring-flanging operation; Fig. 56, a plan view of the blank after the ring-flanging operation; Fig. 57, a broken plan view of the secondary disk or carrier; Fig. 58, a section taken as indicated at line 58 of Figs. 14 and 16, this view showing the cork-introducing and cap-clenching mechanism; Fig. 59, an enlarged broken sectional view showing the cap-clenching operation; Fig. 60, a similar view showing the position of the parts at the end of the cap-clenching operation; Fig. 61, a view of the final product as it comes from the dies shown in Fig. 60; Fig. 62, a view showing the manner in which the stopper is carried by the grippers of the carrier-disk to the stopper-discharge; Fig. 63, a broken plan view showing the cork-feeding means, and particularly the horizontally reciprocating plunger which feeds the cork over a cork-lifting plunger which elevates it to the cap; Fig. 64, a vertical section taken as indicated at line 64 of Fig. 1 and showing the centrifugal-feed cork-delivering means employed; Fig. 65, a broken section taken as indicated at line 65 of Fig. 15, being a section of the cork-channel adjacent the hopper and showing a friction-disk which rests edgewise on the corks in said channel; and Fig. 66, a broken plan view showing the position where the web-setting operation is performed, this being the next operation after the folding operation.

The machine, in its preferred construction, comprises a frame A, having a bed A' and a housing $A^2$, the bed A' being surmounted by a removable bed-plate $A^3$; a vertically reciprocating cross-head B carrying a detachably secured punch-plate, or block, B', the cross-head B being actuated by a horizontal drive-shaft $B^2$ which also imparts motion to the vertical shaft $B^3$ which drives a horizontal cam-shaft $B^4$ disposed beneath the bed of the machine; a main rotary-disk, or die-plate, C equipped near its periphery with a series of annularly arranged dies C'; a secondary rotary disk, or carrier, D lying in a plane slightly above the plane of the disk C and slightly overlapping said disk C, said carrier D being equipped with an annular series of pairs of grippers D'; mechanism E for actuating the rotary disks; a stationary lower blanking-die F (Fig. 16) beneath which the peripheral portion of the disk C rotates; a lower piercing-die G located adjacent the periphery of the die, or disk, C; a stationary lower tab-beading die H located adjacent the periphery of the disk C; a folder I mounted on the bed of the machine adjacent the periphery of the disk C; a stationary lower ring-flanging die J located beneath the peripheral portion of the secondary disk D; a stationarily-mounted cap-clenching die K located beneath the peripheral portion of the secondary disk D, in the rear of the die J; cork-feeding means L operative to feed corks to the cap-clenching dies; a stopper-discharge M (Fig. 53); treadle-controlled clutch-releasing means N (Figs. 3 and 6); and automatically-controlled clutch-releasing mechanism P (Figs. 2, 4 and 9). The frame A may be of any suitable construction. The construction shown is simple, and well adapted to the purpose.

The punch-carrying plate, or head, B' is equipped with blanking-punches 1 (Figs. 1 and 13); a cap-flanging and beading punch 2; a ring-piercing punch 3; a tab-beading punch 4; a web-setting punch 5; a transfer-punch, or follower, 6 which coöperates with a plunger working from beneath in the operation of transferring a blank from the primary to the secondary disk, or carrier; a ring-flanging punch 7; a cap-clenching punch 8; and a discharge-punch 9. The cross-head is further equipped with a locking-pin 10 for the main rotary die-plate, and a locking-pin 11 for the rotary carrier, or secondary disk. These locking-pins, while they normally move with the head B', are also movable with relation to said head and form a part of the automatic clutch-disengaging mechanism P.

The punches 1 to 6 inclusive coöperate with the annular series of dies C' carried by the disk C, as the dies C' are progressively carried beneath the punches. The punches 7, 8 and 9 coöperate with the holders or grippers D' of the carrier D (Fig. 57); and the punches 7 and 8 coöperate, also, respectively, with the lower cap-flanging die J and cap-clenching die K.

The twin punches 1, which are web-connected (Fig. 28), coöperate with the female blanking-die F which is stationarily supported above the path of travel of the disk-carried dies C'. Fig. 28 shows the condition after the blank 12 has been punched from a metal strip 13 and depressed into one of the dies C'. The blank 12 (Fig. 32) comprises a cap-disk 14 and a retainer-ring disk 15 connected by a web 16. Figs. 35 and 36 show the condition of the blank after the next operation—that is, after the operation of the cap-flanging and beading dies and the ring-piercing dies shown in Fig. 33. After this operation, the cap-disk has a downturned flange 17; and upraised tab-centering beads 18; and the ring-disk has been ring-pierced to afford a centrally disposed tab 19. After the operation of the tab-beading dies shown in Fig. 39, which is performed at the next step, the blank presents the appearance shown in Fig. 41—that is, the tab has been suitably beaded to center on the beadings 18 of the cap-disk after the folding operation. At the next operation, the folder I operates in the manner shown in Fig. 46, thereby bringing the retainer-ring to a position substantially parallel with and surmounting the cap, as shown in Fig. 48. At the next operation, the web 16 is struck or given a set by the punch 5, as indicated by dotted lines in Fig. 66, to insure that the retainer-disk shall lie flat on the cap-disk. After this, the blank is transferred to the carrier D and advanced to the position of the ring-flanging dies which operate in the manner shown in Fig. 55 to provide the ring with an up and out-turned locking-flange 20 adapted to engage the annular groove in the mouth of the bottle. Thus, the product is changed to the form shown in Figs. 55 and 56. The blank is then returned to the carrier and advanced to the position where the cork 21 is inserted and the cap-flange clenched thereon in the manner shown in Fig. 60, thus producing the final product shown in Fig. 61. The finished stopper is then returned to the carrier and advanced to the discharge position, where the punch 9 operates to effect the discharge into the discharge-chute M (Fig. 53).

The construction of the rotary die-plate C and dies C' carried thereby will be understood by reference to Figs. 16, 19, 24, and 28 and 31 inclusive. Said rotary dial comprises a heavy steel disk or circular plate 22; a thinner plate 23 secured to the bottom thereof; and a depending sleeve 24 which is firmly secured to said disks, as by means of screws 25 (Fig. 24). This sleeve 24 has formed integral with the lower portion thereof a worm-wheel 26 through the medium of which the rotary member C is actuated. The sleeve 24 is journaled on a post 27 whose base is firmly secured in the bed-plate A³. The lower blanking-die F has an inward extension 28 which fits upon a reduced extension of the post 27 and is firmly secured thereon by a nut 29. Thus the post 27 forms the journal for the rotary member C and also forms a support for the inner end of the die-block F.

Each die C' is adapted to receive therein the cap-disk 14 of a blank 12 and to coöperate with the upper cap-flanging and beading die 2 (Fig. 33). Each die C' comprises a circular die-member, or punch, 30 encircled by a sleeve or tubular holder 31. The die-member 30 is firmly set in the peripheral portion of the disk 22, while the sleeve 31 is vertically movable in a recess 32. The sleeve 31 has an internal recess 33 at its upper end, in which the cap-disk 14 of the blank 12 is adapted to fit snugly, as shown in Fig. 28, when the sleeve or tubular holder is in the elevated position. The sleeve 31 is provided at diametrically opposite points with depending pins 34 which extend through perforations in the lower disk 23 of the member C and are adapted to be engaged by a spring-held plunger 35 mounted in the die-block A³ at a point beneath the blanking-dies (Fig. 24). The plunger 35 is adapted to be elevated intermittently by the cam-actuated plunger 36 which works through the bed A' and co-acts with a cam 37 on the cam-shaft B⁴. The die member 30 which is fixedly secured to the member C is provided in its upper surface with circular grooves 38 (Fig. 31) which are adapted to produce the beadings 18 shown in Fig. 35, while the space 33 in the tubular holder 31 is adapted to permit the marginal portion of the cap-disk 14 to be turned down over the upper end of the die 30 to form the cap-flange 17. This will be readily understood by reference to Fig. 34 where, it is noted, the sleeve 31 has dropped, owing to the cap-flanging operation. As will be understood from Figs. 28 and 31, the outer portion of the sleeve 31 is cut away flush with the periphery of the disk C, and the sleeve is suitably recessed radially, as shown at 39 to accommodate the web 16 of the blank. It may be added that the cap-disk of the blank is forced into the tubular holder 31 by the blanking-die, and, resting upon the top of the die 30, holds the member 31 elevated, with the ring-disk of the blank projecting radially (see Fig. 33), till the cap-flanging operation occurs, when the member 31 drops (see Fig. 34). Thereafter, the cap-flange embraces the upper end of the die 30, so that the blank, still maintaining its radial position, will be carried to the tab-beading position, then to the folding position, and finally to the transferring position. The disk C is provided with an annular series of perforations 40 which co-act with the locking-pin 10 carried by the cross-head B'.

The construction of the rotary carrier D will be understood from Figs. 17, 19, 53, 55 and 57. It comprises a disk 41 provided with an annular series of perforations 42 guarded by the several pairs of grippers or blank-holders D'. Each pair of grippers comprises two jaw members 43 connected at their inner ends with the disk 41 by pivotal screws 44. The members of each pair of jaws are provided with complemental half-circular recesses 45, and the outer ends of the jaws are provided with slots 46 which accommodate the shanks of screws 47 which rise from the margin of the disk 41 and afford guides for the outer ends of the jaw-members. At the recesses 45, the jaws are provided with depending segments, or crescent-shaped members 48 which are recessed interiorly, as shown at 49 (Fig. 55). When the blank is elevated or transferred from the main rotary disk, it is received in the recess 49 of a pair of grippers D'. The recesses 45 are beveled at their upper portions, as indicated at 50; and the jaws are normally held in the closed position by springs 51, as shown in Fig. 57. The disk 41 is adapted to surmont a flanged sleeve 52 to which the disk is secured by screws 53. The sleeve 52 (Figs. 19 and 53) is provided at its lower end with a worm-wheel 54 through the medium of which the member D is actuated. The sleeve is journaled on a post 55 which is secured in the bed-plate $A^3$ at a suitable distance from the post 27. The bed-plate $A^3$ is recessed on its upper surface, as indicated at 56, to accommodate the operative parts. The disk D is provided with an annular series of locking perforations 57 to coöperate with the locking-bolt 11 carried by the cross-head B'.

The mechanism E for rotating the disks C and D in opposite directions through the medium of the worm-wheels 26 and 54 will be understood from Figs 17, 19, and 20 to 23 inclusive. It comprises a shaft 58 equipped with oppositely-threaded worms 59 and 60 which engage the worm-wheels 26 and 54 respectively, the shaft 58 being journaled in the bed-plate $A^3$; a pinion 61 secured on one end of the shaft 58 and meshing with a gear 62 journaled on a shaft 63 and equipped with a pair of spring-held dogs, or pawls, 64 which co-act with a ratchet-wheel 65 on one end of a sleeve 66 which is journaled on the shaft 63, the opposite end of the sleeve 66 being equipped with an integrally formed pinion 67 which meshes with a vertically reciprocating rack 68; and a cam-arm 69 which is linked to the lower end of the rack 68 and actuated by a cam 70 mounted on the shaft $B^4$. The gear 62 is fitted with a friction-disk 71 with which co-acts a friction-band 72 adapted to prevent idle movement. The friction-disk 71 is provided with recesses 73 for the pawls 64. It will be understood that when the sleeve 66 is rotated in one direction by the rack 68, the gear 62 will be actuated through the medium of the ratchet-wheel 65 and pawls 64; and that when the sleeve 66 is rotated in the opposite direction by the rack 68, the pawls 64 will slip over the teeth of the ratchet-wheel 65. As shown in Figs. 19 and 23, one end of the shaft 58 is equipped with a ratchet-wheel 74 with which engages a spring-pressed pawl 75 adapted to prevent retrogressive movement of the shaft 58.

Referring again to the lower blanking-die F shown in Figs. 17, 18 and 28, it is provided with a suitably shaped perforation 76 wherethrough the blank may be punched, and is equipped with a surmounting stripper 77. Between the stripper and the upper surface of the die F is an obliquely disposed feed-channel 78 for the metal strip 13. Forming a continuation of this channel is a guide 79. The die-block F, in addition to being supported at its inner end on the post 27, is mounted on a block 80 which is removably mounted on the bed-plate $A^3$. Back of the block 80—that is, in the direction of rotation of the member C, is a fixedly secured segmental housing-member 81 (Fig. 30). Over this extends a segmental guard 82 (Fig. 15) which is pivoted at 83. The rear end of the guard 82 extends to the female piercing-die G which is fixedly mounted on the bed-plate $A^3$. The die G is located adjacent the periphery of the member C, as will be understood from Figs. 33 and 34. It has a crescent-shaped perforation 84 and is surmounted by a stripper 85 having a similar perforation. Beneath the die G is a waste-discharge passage 86. The upper cap-flanging die 2 (Fig. 37) comprises a shank carrying a tubular member 87 adapted to fit over the upper end of the lower cap-flanging die 30. The shank of the die 2 is fitted with a spring-held plunger 88 which is capable of limited movement with relation to the shank and provided at its operative end with suitable cap-beading means 89. The ring-piercing punch 3 is suitably recessed to enter the crescent-shaped recess 80 of the lower die G. Inasmuch as the lower cap-flanging die is carried by the disk C, it is preferred to provide an anvil or support 90, as shown in Fig. 34, upon which the marginal portion of the disk C may rest at the moment when the cap-flanging and beading operation is performed. This anvil 90 is provided in its upper end with a slot 91 adapted to receive the pins 34 of the sleeve 31 when the sleeve drops at the instant the cap-flange is produced.

The lower beading-die H is securely mounted on the bed-block $A^3$ and provided in its upper end with a suitable matrix (Figs. 39 and 40) adapted to receive the suitably shaped lower end of the tab-beading punch 4. When the blank is carried to the tab-beading dies, it is done through the medium of the lower cap-flanging and beading die 30 upon which the cap-flange fits snugly, as shown in Fig. 40.

The folder mechanism I is adapted to coact with a stationary anvil, or folder-finger, 92, (Figs. 15, 18 and 45) which is carried by the extension 28 of the die F. The stationary anvil 92 projects to a point flush with the periphery of the disk C, and is provided with a small up-standing guide-lug 93 which operates to engage one edge of the web 16 of the blank and guide the retainer-ring in the folding operation. The mechanism I comprises a vertically disposed tubular guide 94 carried by a bracket 95 supported by the bed-plate $A^3$; a vertically movable plunger 96; and a bell-crank folder-finger 97 connected with the plunger 96 by a pivot 98 and having a nose, or finger, 99 adapted to perform the folding operation. The member 97 is suitably guided through a cap-piece 100, so that when the plunger 96 rises, the member 97 will partake of a straight vertical movement, whereby the web 16 of the blank will be bent so that the retainer-ring will stand perpendicularly to the cap; then a shoulder, or knee, 101 constituting the short arm of the bell-crank 97 will engage a stop 102, causing the member 97 to swing, as shown in Fig. 46, thereby completing the folding operation. Prior to the folding operation, it will be understood, the cap-portion of the blank is carried beneath the anvil 92. The parts are so disposed as to have a slight tendency to throw the retainer-ring slightly off center and toward the guide-member 93 of the anvil. This is resisted by the slightly beveled guide-member 93, which causes the retainer-ring to be brought to a properly centered position. The plunger 96 is actuated by a plunger 103 (Fig. 42) connected to a cam-lever 104 which is actuated by a cam 105 on the shaft $B^4$. After the folding operation, the blank is advanced to the position indicated at 106 in Fig. 15, where the punch 5 operates to strike the web of the blank and give it a set, as will be understood from Fig. 66.

It should be stated that Fig. 15 does not show the rotary disks C and D in their locked position. That is, they are not there shown properly centered to permit the upper cross-head to descend. In Fig. 16, however, the disk C is shown in the position which it occupies when the cross-head descends and the various operations on the blanks are performed. The transfer is effected at the point numbered 107 at a moment when both disks are locked, and a pair of grippers D' is located above one of the dies C'. The means which coöperates with the punch or follower 6 rigidly mounted on the cross-head B', for effecting the transfer, is illustrated in Figs. 49 and 52. Each die-member 30 of the series of dies C' mounted on the disk C is provided with a vertical axial perforation through which works a spring-depressed plunger 108 which is adapted to be elevated by a spring-depressed plunger 109 mounted in the bed-block $A^3$ beneath the point 107 indicated in Fig. 16. The plunger 109, in turn, is adapted to be actuated by a plunger 110 which works through the bed A', and, as shown in Fig. 49, is actuated by a cam-arm 111 engaged by a cam 112 mounted on the cam-shaft $B^4$. When the cross-head B' descends, the punch 6 is lowered through a pair of grippers D' into engagement with the blank carried by the die 30; and, as the cross-head ascends, the plunger 108 follows, being actuated through the cam 112.

Fig. 52 shows the position of the parts after the transfer has been effected, the punch 6 being shown in dotted lines. The folded blank is thus left in the recess 49 of the appropriate pair of grippers D'. After the transfer is effected, the plunger 108 drops, so that the disk D will be free to rotate. After the transfer, the blank is carried by the disk D to a position above the lower ring-flanging die J (Fig. 16). The manner in which the ring-flanging is effected will be understood by reference to Figs. 53, 54 and 55. The punch 7 carried by the cross-head B' is equipped with a spring-pressed follower, or centering member, 113; and as the punch 7 descends, the blank 12 is clamped between the punch 7 and a vertically movable die 114 (Fig. 54), forming a part of the die J. The die J comprises, in addition to the die-member 114, a cup-shaped die-block 115 which is rigidly mounted on a die-block 116 secured to the bed-plate $A^3$. The plunger-form die, or follower, 114 works through the cup-shaped die 115, its lower end being secured to the spring-pressed plug 117 carried by a plunger 118 which works through the bed-plate $A^3$ and bed A'. The plunger 118 is actuated by a cam 119 mounted on the shaft $B^4$. As the punch 7 and the movable lower die-member 114 descend, the blank is carried into the cup-shaped die-member 115 where the upwardly and outwardly turned locking-flange 20 of the locking-ring is produced in the manner shown in Fig. 55, it being noted that the punch 7 is provided at its lower end with an external recess 120 (Fig. 54) which permits the flange to be turned upwardly. After the ring-flanging operation, the punch 7 ascends and is followed by the follower 114, so that the blank is again elevated to a position where it will be gripped by the grippers D'. To give to the plunger 118 the double-rising movement necessary, the cam 119 is provided with two high points, as shown in Fig. 53. After the ring-flanging operation, the blank is carried to a position above the lower cork-clenching die K shown in Fig. 16. The operation of the cork-clenching devices will be understood from Figs. 58–60. The cap-clenching punch 8 is provided with a spring-pressed follower, or centering-member, 121 which is adapted to engage the tab of the blank 12.

The die K comprises a die-block 122 fixedly mounted on the bed $A^3$; a suitably matrixed lower clenching-die 123 secured in the die-plate 122; a cork-elevating plunger and stopper-follower 124 working through the die-block 122; a cam-actuated plunger 125 working through the bed $A'$ and bed-plate $A^3$ and having its upper end secured to the lower end of the plunger 124; and a cam 126 mounted on the shaft $B^4$ and serving to actuate the plunger 125. Inserted in the block 122 is a channeled block 127 (Figs. 59 and 63) which forms a terminus for the channel through which the corks are introduced from the mechanism L. The block 127 is provided with a rearwardly extending channel 128 which intercepts a bore 129 through which the plunger 124 works. As shown in Fig. 60, the die 123 is suitably matrixed, the matrix converging downwardly, so that the downturned cap-flange will be clenched on the upper portion of the cork-disk when the blank is forced downwardly by the punch 8.

The cam 126 has a low surface 130 which corresponds with the cork-feeding position, i. e., with the lowermost position of the cork-elevating plunger 124, permitting the cork disk to be fed above it by the plunger 150 (Fig. 63). The cam then rises somewhat in its contour and has a small concentric portion 131 which corresponds with the position in which the cork is supported just prior to the clenching operation. The cam has a slightly higher point 132 which corresponds with the clenching position when the member 124 is at the place shown in Fig. 60, a slightly extra pressure being exerted upon the cork at the instant of the clenching operation. The cam is relieved, as indicated at 133, to relieve the pressure an instant after the clenching operation. As the punch 8 ascends, a still higher portion 134 of the cam serves in the ejecting operation, that is, in re-transferring the stopper to the carrier D. Following the high portion 134, the cam has a lower concentric portion 135 which corresponds with the position of the follower 124 when its upper end is flush with the upper surface of the die-block 123, so that it will afford a support when the next metal part is dropped into the die 123, i. e., will tend to prevent the cap from assuming a position on edge. Thus the follower 124 will aid in centering the blank and will then recede to admit of the feeding of another cork-disk above its upper end. When the completed stopper is delivered to the carrier D after the clenching operation, it occupies the position in the grippers $D'$ shown in Fig. 62.

After the cork-inserting and clenching operation, the stopper is carried to a position beneath the discharge punch 9, which operates to punch the stopper from the grippers and discharge it through the discharge-chute M shown in Fig. 53. The double-discharge chute is employed to deliver the stoppers at the front of the machine, any suitable receptacle (not shown) being provided.

The cork-feeding mechanism L will be understood by reference to Figs. 2, 3, 15, 58, 63–65. It comprises a hopper having a stationary bottom 136 supported on a bracket 137 and provided with a peripheral wall 138 whose upper portion is cut away at one side of the hopper, as indicated at 139 in Fig. 64, to afford one wall of a curved cork-channel 140, whose other wall is afforded by a wall or diaphragm 141; a rotary disk 142 affording a bottom for the hopper and whose periphery projects beneath the curved cork-channel 140; a shaft 143 journaled in the bracket 137 and equipped at its lower end with a pulley 144 which is joined by a belt 145, passing over idlers 146 (Fig. 2), with the pulley 147 on the shaft $B^4$; a straight cork-channel 148 tangential to the hopper and forming a continuation of the channel 140; a channel 149 at right angles to the terminal end of the channel 148 and in alinement with the channel 128; a cork-delivering plunger 150 (Fig. 63); and a slide 151 serving to actuate the plunger 150 and itself actuated by a rock-lever 152, which, in turn, is operated by a link 153 equipped with a roller 154 which engages a cam 155 on the shaft $B^4$. A spring 156 serves to maintain the roller in engagement with the cam. As appears from Fig. 64, the wall 141 is recessed at 157 to afford an entrance to the cork-channel 140.

The corks, by centrifugal action, are delivered from the disk 142 through the channel 140, whence they pass through the channel 148 to the path of the plunger 150. The channel 140 is surmounted by a stationary wall 158; and, as shown in Figs. 15 and 65, a friction-disk 159 is loosely introduced at one point, so that its periphery will rest upon the corks in the cork-channel, thus insuring sufficient friction between the corks and disk 142 to render it certain that the corks will be forced through the channel 148. At each retraction of the cork-feeding plunger 150, a fresh cork is introduced into the channel 149, as will be understood from Fig. 63.

No novelty is herein claimed for the broad idea of employing centrifugal feed mechanism in a machine of this character.

The improvements in this respect pertain to details for simplifying such a mechanism and improving its operation.

The locking-pins 10 and 11 for locking the disks C and D have already been referred to. These pins coöperate respectively with the perforations 40 of the disk C and the perforations 57 of the disk D.

The treadle-controlled and automatically-controlled devices N and P for controlling the operation of the machine will be understood by reference to Figs. 1-12. Upon the shaft B² is loosely mounted a pulley 160, the inner face of whose hub is provided (Fig. 5) with four radial clutch-recesses 161. These recesses are adapted to be engaged (any one of them) by a clutch member 162 which moves in a slot or way with which the shaft B² and encircling sleeve 163 secured thereon, are provided. The clutch-member, or dog, 162 is spring-projected and is provided with a slot 164 (Fig. 11), which is adapted to be engaged by the clutch-releasing pawls of the treadle-operated clutch-releasing mechanism N and the automatic clutch-releasing mechanism P. The mechanism N comprises a clutch-releasing pawl 165 which is normally held in the clutch-releasing position by a spring 166 (Fig. 4) but adapted to be withdrawn to permit the clutch to connect the shaft to the pulley 160, by means of a rod 167 which connects with a foot-treadle 168.

The mechanism P is adapted to operate automatically to withdraw the clutch-member or key 162 in the event that the disks are not properly centered for the operation of the punch-head B'. This mechanism will be best understood by reference to Figs. 2 and 9. It comprises a key-shifting or clutch-disengaging pawl 169 which is normally held in an inoperative position through the medium of a bell-crank lever 170 to which it is linked, said bell-crank lever being connected with a plunger 171 which moves in frame-carried guides 172 and 173. A spring 174 connected with the guide 172 and with a collar 175 fixed to the lower end of the plunger 171 tends to throw the plunger upwardly and move the dog 169 to the clutch-disengaging position. This movement is normally resisted by a locking-lever 176 which is pivotally mounted on a bracket carried by the guide 173 and has its upper end extending through a slot with which an arm of the collar 175 is provided, and equipped above said arm with a locking-pin 177. A spring 178 serves to hold the locking-lever 176 in the locking position. In order that the locking-lever 176 may be automatically tripped, in the event that the locking-perforations 40 and 57 of the disks C and D do not register with the locking-pins 10 and 11 carried by the head B', said locking-pins are movable in openings 10ª and 11ª (Fig. 13) with which the head B' is provided and are fixedly secured at their upper ends to a plate or bracket-member 179 (Figs. 9 and 12) upon which is mounted, by means of a pivot 180, a bell-crank lever 181 whose upper end is equipped with a roller 182 which bears against the depending arm of the lever 176, and whose lower end is equipped with a cam 183 which engages a cam 184 secured to the punch-carrying plate B'. As shown in Fig. 2, a spring 185 connects the plate 179 to the plate B'. Ordinarily, therefore, the locking-pins 10 and 11 descend regularly with the punch-block B'; but, when either of the locking-pins 10 or 11 encounters an obstruction, as where the co-acting disk is not properly centered with relation to the punches, the pins 10 and 11 will be arrested in their downward movement, thereby lifting the plate 179 of the mechanism P with relation to the punch-carrying plate, causing the cam 183 to slide over the cam 184 and swing the upper end of the trip-lever 181 to the right, as viewed in Fig. 9, thereby swinging the upper end of the lever 176 rearwardly and releasing the arm of the collar 175 from engagement with the pin 177. When thus released, the plunger 171 will be elevated through the medium of the spring 174, thereby throwing the dog 169 to the clutch-disengaging position.

To limit the feed of the sheet metal strip 13 through the oblique guide provided therefor, an automatically actuated stop device Q is employed. This will be understood by reference to Figs. 15, 25-27. It comprises a stop-finger 186 adapted to engage first the inner end of the strip 13, and then the successive perforations made in the strip by the operation of the blanking-dies; a rock-shaft 187 carrying the member 186; a disk 188 loosely mounted on the opposite end of said rock-shaft and equipped with a stud 189 and engaging a transverse pin 190 with which the rock-shaft is provided; a tension-spring 191 connecting the stud 189 with the stationary part; an actuating-arm 192 secured to the rock-shaft; a plunger 193 co-acting with said arm and working through the bed-block A³; and a plunger 194 co-acting with the plunger 193 and working through the bed A', its lower end connecting with a cam-lever 195 which is adapted to be raised at intervals by a cam 196 mounted on the shaft B⁴.

The operation may be summarized thus: The pulley 160 is rotated continuously from any suitable source of power. Normally, the dog 165 engages the sliding key or clutch-member 162 and holds it retracted. When it is desired to operate the machine, the foot-treadle is depressed, thereby withdrawing the dog 165 and allowing the clutch-member 162 to enter one of the slots 161 in the hub of the wheel 160. The operator feeds the strip 13 by an intermittent movement as the stop-finger 186 permits. At each descent of the punch-block B′, a blank is stamped from the strip and lowered into one of the dies C′ of the intermittently moving rotary die-plate C. When the machine is in full operation, the blanking-dies operate to sever a blank at each descent of the punch-head, the punches 2 and 3 operate to flange and bead the cap-disk of a blank and to ring-punch the ring-disk, the punch 4 operates to bead the tab of the ring of another blank, the folder 1 operates to fold the retainer-ring of another blank upon the cap thereof, the punch 5 operates to give a set to the web of a folded blank, the punch 6 and coöperating lower follower 108 operate to transfer a folded blank from one of the dies C′ to a pair of grippers of the carrier D, the punch 7 operates to flange the retainer-ring of a blank, the punch 8 operates to clench a cap on the preparatorily inserted cork-disk, and the punch 9 operates to discharge a completely formed stopper. In the normal operation of the machine, the locking-pins 10 and 11 descend with the punch-block, but, under abnormal conditions, will be raised with relation to the punch-block, thereby causing the trip lever 176 to be disengaged from the plunger 171, thereby permitting the clutch-disengaging dog 169 to be thrown to a position to withdraw the clutch-key 162. Thus, the operation of the machine is automatically discontinued, notwithstanding the operator may be holding the foot-treadle depressed and the dog 165 away from the clutch-disengaging position.

Some of the advantages of the improved machine are that it may be made of comparatively light build, may be operated at rapid speed, and the parts are readily accessible and the work, comparatively speaking, open to observation.

The foregoing detailed description has been given for clearness of understanding only, and no undue limitation should be understood therefrom, but the appended claims should be construed as broadly as permissible in view of the prior art.

What I regard as new and desire to secure by Letters Patent is—

1. In a machine of the character set forth, the combination of a rotary member, means co-acting therewith for forming a cap and means for surmounting a retainer-ring thereon, a secondary rotary member, means for effecting transfer of a blank from said first-named rotary member to said secondary member, and means co-acting with said secondary rotary member for inserting and securing a seal-disk in the cap.

2. In a machine of the character set forth, the combination of a blanking-die, an intermittently-actuated rotary die-plate moving beneath the blanking-die and equipped with a series of annularly arranged dies, a rotary carrier overlapping said die-plate, co-acting means for operating upon blanks in various stages of formation, and means for effecting transfer of the blanks from the rotary die-plate to the carrier.

3. In a machine of the character set forth, the combination of a rotary die-plate equipped with an annular series of dies, an oppositely rotating carrier, means for punching blanks and delivering the same in succession to said dies, coöperating means adapted to co-act with said dies to transform the blank into a cap and surmounting retainer ring, means for effecting the transfer of the blanks in succession, after such transformation, from said dies to said carrier, and means coöperating with the carrier for introducing and securing seal-disks in the caps of said blanks.

4. In a machine of the character set forth, the combination of a rotary die-plate equipped with a series of dies, means for severing double-disk blanks and delivering them to said dies, a folder co-acting with said dies and adapted to surmount one disk of a blank on the other disk thereof, a rotary carrier, means for effecting transfer of the blanks from said dies to said carrier, and means co-acting with the carrier for applying seal-disks to the blanks.

5. In a machine of the character set forth, the combination of a rotary die-plate equipped with a series of dies, co-acting means for producing a down-flanged cap and surmounting a retainer-ring thereon, a rotary carrier, means for effecting transfer of the blanks to said carrier, and means co-acting with said carrier for applying seal-disks to the blanks.

6. In a machine of the character set forth, the combination of a rotary die-plate equipped with a series of dies, co-acting means for producing a down-flanged cap and surmounting retainer-ring, a rotary carrier, means for effecting transfer of the blanks to said carrier, means co-acting with said carrier for up-flanging the retainer-ring, and means for applying a seal-disk to the cap.

7. In a machine of the character set forth, the combination of a rotary die-plate equipped with a series of dies, means for producing a double-disk blank and delivering the same to one of said dies with the cap-disk received by the die, means co-operating with said dies for down-flanging the cap-disk, and a folder co-acting with said dies and operative to fold the retainer-disk on the cap-disk.

8. In a machine of the character set forth, the combination of a rotary die-plate equipped with a series of dies, means for producing a double-disk blank and delivering the same to one of said dies with the cap-disk received by the die, means coöperating with said dies for down-flanging the cap-disk, means for ring-punching the retainer-ring disk, and a folder having a stationary mounting adjacent the periphery of said die-plate and operative to fold the retainer-rings of the blanks upon the cap-disks.

9. In a machine of the character set forth, a rotary die-plate equipped with a series of lower cap-flanging and beading dies, an upper cap-flanging and beading punch, blank-holders encircling said dies and adapted to receive one disk of a double-disk blank and permit the other disk to project, means for elevating said blank-holders with relation to the dies, means for folding the blank to superpose the projecting disk upon its companion disk, a female blanking-die above the path of said first-named dies adapted to produce double-disk blanks, and a coöperating blanking-punch.

10. In a machine of the character set forth. a rotary die-plate equipped with a series of lower cap-flanging dies, blank-holders encircling said dies and having slots to receive the web of a double-disk blank, means for elevating said blank-holders with relation to the dies, a female blanking-die above the path of said first-named dies and adapted to produce a double-disk blank, a coöperating blanking-punch, a cap-flanging punch co-acting with said first-named dies, and means for folding the blank, thereby to superpose one disk of the blank on the other disk thereof.

11. In a machine of the character set forth, a rotary die-plate equipped with a series of lower cap-flanging and beading dies, blank-holders encircling said dies, means for elevating said blank-holders with relation to the dies, a female blanking-die above the path of said first-named dies, a coöperating blanking-punch, a cap-flanging and beading punch co-acting with said first-named dies, a stationarily-mounted female ring-piercing die adjacent the periphery of said die-plate, and a coöperating ring-piercing punch.

12. In a machine of the character set forth, a rotary die plate equipped with a series of lower cap-flanging and beading dies, blank-holders encircling said dies, means for elevating said blank-holders with relation to the dies, a female blanking-die above the path of said first-named dies, a coöperating blanking-punch, a cap-flanging and beading punch co-acting with said first-named dies, a stationarily-mounted female ring-piercing die adjacent the periphery of said die-plate, a coöperating ring-piercing punch, a lower tab-beading die adjacent the periphery of said die-plate, and a coöperating tab-beading punch.

13. In a machine of the character set forth, a rotary die-plate equipped with a series of lower cap-flanging and beading dies, blank-holders encircling said dies, means for elevating said blank-holders with relation to the dies, a female blanking-die above the path of said first-named dies, a coöperating blanking-punch, a cap-flanging and beading punch co-acting with said first-named dies, a stationarily-mounted female ring-piercing die adjacent the periphery of said die-plate, a coöperating ring-piercing punch, a lower tab-beading die adjacent the periphery of said die-plate, a coöperating tab-beading punch, and a folder mounted on the frame adjacent the periphery of said die-plate.

14. In a machine of the character set forth, a rotary die-plate equipped with a series of lower cap-flanging and beading dies, blank-holders encircling said dies, means for elevating said blank-holders with relation to the dies, a female blanking-die above the path of said first-named dies, a coöperating blanking-punch, a cap-flanging and beading punch co-acting with said first-named dies, a stationarily-mounted female ring-piercing die adjacent the periphery of said die-plate, a coöperating ring-piercing punch, a lower tab-beading die adjacent the periphery of said die-plate, a coöperating tab-beading punch, a stationary anvil beneath which the cap-disks are carried, and a coöperating movable folder-member mounted adjacent the periphery of said die-plate.

15. In a machine of the character set forth, the combination of a series of cap-flanging dies moving in an annular path, means for producing a blank composed of a cap-disk and a ring-disk connected therewith and delivering the same to one of said dies with the cap-disk superposed on it, a coöperating punch for down-flanging the cap-disk, leaving the ring-disk projecting outwardly from the die, a ring-piercing die adjacent the path of travel of said first-named dies, and a coöperating ring-piercing punch.

16. In a machine of the character set forth, the combination of a series of cap-flanging dies moving in an annular path, coöperating means for down-flanging the caps of double-disk blanks placed on said dies, leaving the other disks projecting outwardly from the dies, and means for ring-piercing the projecting disks as they are successively carried into position by said first-named dies.

17. In a machine of the character set forth, the combination of a series of cap-flanging dies moving in an annular path, coöperating means for down-flanging the caps of double-disk blanks placed on said dies, leaving the other disks projecting outwardly from the dies, means for ring-piercing the projecting disks as they are successively carried into position by said first-named dies, and means for beading the tabs of the ring-disks as they are successively carried into position by said first-named dies.

18. In a machine of the character set forth, the combination of a series of cap-flanging dies moving in an annular path, coöperating means for down-flanging the caps of double-disk blanks placed on said dies, leaving the other disks projecting outwardly from the dies, means for ring-piercing the projecting disks as they are successively carried into position by said first-named dies, means for beading the tabs of the ring-disks as they are successively carried into position by said first-named dies, and means for folding the ring-disks on the cap-disks as they are successively carried into position by said first-named dies.

19. In a machine of the character set forth, the combination of a pair of rotary members, one of said members equipped with an annular series of dies, and the other with an annular series of blank-holders, means for operating upon double-disk blanks in said dies, means adjacent the path of the dies for folding the blanks to superpose one disk upon the other, means for effecting the transfer of the folded blanks to the other rotary member, and means for performing the final operations on the blanks after said transfer has been effected.

20. In a machine of the character set forth, the combination of a rotary member equipped with a series of blank-holders, coöperating means for producing a down-flanged cap and a surmounting retainer-ring and transferring the same, in folded condition, to one of said blank-holders, a lower ring-flanging die beneath said carrier, and a coöperating ring-flanging punch working through the carrier, said die and punch adapted to up-flange said surmounting retainer ring.

21. In a machine of the character set forth, the combination of a rotary member equipped with a series of blank-holders, means for producing a down-flanged cap and surmounting an expansible retainer-ring thereon and transferring the article, in this condition, to one of said blank-holders, a lower ring-flanging die beneath said carrier, a coöperating ring-flanging punch working through the carrier, said die and punch adapted to up-flange the surmounting retainer-ring, a lower cap-clenching die beneath said carrier, and an upper cap-clenching punch working through said carrier.

22. In a machine of the character set forth, the combination of a rotary carrier, means for producing blanks having down-flanged caps and surmounting expansible retainer-rings and delivering the same to said carrier, an annular cap-clenching die beneath the carrier, means for delivering seal-disks through said die, and an upper cap-clenching punch working through the carrier.

23. In a machine of the character set forth, the combination of a rotary carrier, means for producing blanks having down-flanged caps and surmounting expansible retainer-rings and delivering the same to said carrier, a lower ring-flanging die beneath the carrier adapted to up-flange the surmounting retainer-ring, a coöperating ring-flanging punch working through the carrier, said die having a follower adapted to elevate the blank to the carrier after the ring-flanging operation, a lower cap-clenching die beneath the carrier, a coöperating cork-elevating and stopper-transferring plunger, and an upper cap-clenching punch working through said carrier.

24. In a machine of the character set forth, the combination of a pair of rotatable disks, one equipped with a series of cap-flanging dies and the other equipped with a series of blank-holders, means coöperating with the first disk and dies thereof for producing blanks having down-flanged caps and surmounting expansible retainer-rings, means for effecting transfer of the blanks to the blank-holders of the second disk, means co-acting with the second disk for applying seal-disks to said blanks, and means for intermittently rotating the disks.

25. In a machine of the character set forth, the combination of a rotary carrier equipped with an annular series of pairs of grippers, coöperating means for producing blanks composed of caps and surmounting expansible retainer-rings and effecting transfer of said blanks to said grippers, and means coöperating with said carrier for applying seal-disks to the blanks.

26. In a machine of the character set forth, the combination of a rotary carrier equipped with an annular series of pairs of grippers, coöperating means for producing blanks composed of caps and surmounting expansible retainer-rings and effecting transfer of said blanks to said grippers, means coöperating with said carrier for up-flanging the retainer-ring, and means coöperating with the carrier for introducing seal-disks and securing them to the caps.

27. In a machine of the character set forth, the combination of a series of cap-flanging dies adapted to move in an annular path, means for applying double-disk blanks to said dies with one disk of each blank projecting outwardly from the die to which it is applied, and a folder co-acting with said dies, comprising an anvil, a vertically movable plunger, and a folder-finger mounted on the plunger and coacting with said anvil.

28. In a machine of the character set forth, the combination of a series of cap-flanging dies adapted to move in an annular path, means for applying double-disk blanks to said dies with one disk of each blank projecting outwardly from the die to which it is applied, and a folder co-acting with said dies. comprising an anvil, a vertically movable plunger, and a folder-finger co-acting with said anvil, said folder-finger having an initial vertical movement and then an inward movement over the anvil.

29. The combination with a rotary member equipped with a series of dies and coöperating means for producing a cap and a retainer-ring and surmounting the retainer-ring upon the cap, of a second rotary member moving in unison with the first named rotary member, means for effecting transfer of the articles thus formed to said second-named rotary member, and means co-acting with said second-named rotary member and adapted to up-flange the retainer-ring and apply a seal disk to the cap.

30. In a machine of the character set forth, the combination with a carrier equipped with a series of blank-holders adapted to move in an annular path, of an annular lower cap-clenching die located beneath said carrier, a cork-elevating and stopper-transferring plunger associated therewith, and an upper cap-clenching punch adapted to work through said carrier.

31. In a machine of the character set forth, the combination of a rotary die-plate equipped with a series of lower cap-flanging dies, means for punching blanks composed of a cap-disk and ring-disk connected by a web and delivering them with the cap-disk held on the cap-flanging die and the ring-disk projecting, an upper cap-flanging die, a lower ring-piercing die beneath the path of travel of the ring-disks, an upper ring-piercing die, a folder operative to fold the ring-disks on the cap-disks while on the lower cap-flanging dies, a rotary member provided with a series of blank-holding devices adapted to overlap said lower cap-flanging dies, vertically reciprocating means operative to transfer the folded blanks to said blank-holding devices, and ring-flanging means coacting with said blank-holding devices.

32. In a machine of the character set forth, the combination with a rotary carrier equipped with a series of blank-holders and means for producing and delivering to said blank-holders blanks composed of caps and surmounting retainer-rings, of seal-disk-introducing and cap-clenching means comprising a cap-clenching die located beneath said carrier, a plunger operating to deliver seal-disks to said die, a centrifugal feed-device operative to deliver seal-disks to said plunger, and an upper cap-clenching punch.

33. In a machine of the character set forth, the combination with cap-clenching means, of cork-introducing means comprising a plunger, a cork-channel leading to the path thereof and equipped with a loosely mounted friction-disk adapted to rest on the corks therein, and a hopper having a rotary member adapted to force the corks through said channel and beneath said friction-disk.

34. In a machine of the character set forth, the combination of a pair of horizontally disposed overlapping disks, one of said disks equipped with a series of dies and the other with a series of blank-holders, means for intermittently rotating said disks in unison, coöperating punches, cap-clenching dies co-acting with the holder-equipped disk, and a hopper having in its bottom a horizontally disposed rotary disk and equipped with a feed-channel through which seal-disks may be delivered to the cap-clenching dies.

35. In a machine of the character set forth, the combination of a rotary die-plate equipped with a series of lower cap-flanging dies, means for punching blanks composed of a cap-disk and ring-disk connected by a web and delivering them with the cap-disk held on the cap-flanging die and the ring-disk projecting, an upper cap-flanging die, a lower ring-piercing die beneath the path of travel of the ring-disks, an upper ring-piercing die, a folder operative to fold the ring-disks on the cap-disks while on the lower cap-flanging dies, a rotating member provided with a series of blank-holding devices adapted to overlap said lower cap-flanging dies, vertically reciprocating means operative to transfer the folded blanks to said blank-holding devices, ring-flanging means co-acting with said blank-holding devices, and means co-acting with said blank-holding devices for inserting and securing sealing-disks in the flanged caps.

36. In a machine of the character set forth, the combination of a pair of rotary members, one of said members equipped with an annular series of dies and the other with an annular series of blank-holders adapted to overlap said dies, means for operating upon double-disk blanks in said dies, means adjacent the path of the dies for folding the blanks, means reciprocable through said dies for transferring the folded blanks to said blank-holders in succession, and means for performing the final operations on the folded blanks after said transfer has been effected.

37. In a machine of the character set forth, the combination of a series of cap-flanging dies moving in an annular path, means for producing a blank composed of a cap-disk and a ring-disk connected therewith and delivering the same to one of said dies with the cap-disk superposed on it, a coöperating punch for down-flanging the cap-disk, leaving the ring-disk projecting outwardly from the die, a ring-piercing die adjacent the path of travel of said first-named dies, a coöperating ring-piercing punch, a folder operative to fold the ring-disk over the cap-disk, a rotary member equipped with an annular series of blank-holders adapted to overlap said first-named dies, means operative through said first-named dies for effecting the transfer of the folded blanks to said blank-holders, and means coöperating with said blank-holders for introducing and securing sealing-disks in the capdisks.

38. In a machine of the character set forth, the combination of a rotary die-plate equipped with a series of dies, co-acting means for producing from a double-disk blank a down-flanged cap and surmounting retainer ring, a rotary carrier equipped with a series of blank-holders adapted to overlap said dies, means operative through said dies to effect transfer of the folded blanks to said blank-holders, and co-acting means for up-flanging the retainer-rings.

39. In a machine of the character set forth, the combination of a rotary die-plate equipped with a series of dies, co-acting means for producing from a double-disk blank a down-flanged cap and surmounting retainer-ring, a rotary carrier provided with a series of blank-holders adapted to overlap said dies, means operative through said dies for effecting transfer of the blanks to said blank-holders, means co-acting with said carrier for up-flanging the retainer-ring, and means co-acting with said carrier for applying a seal-disk to the cap.

40. In a machine of the character set forth, the combination of a rotary die-plate equipped with a series of dies, means for producing a double-disk blank and delivering the same to one of said dies with the cap-disk received by the die and the other disk projecting, means coöperating with said dies for down-flanging the cap-disk, a folder co-acting with said dies and operative to fold the retainer-disk on the cap-disk, a rotary carrier equipped with a series of blank-holders adapted to overlap said dies, means operative through said dies to effect transfer of the blanks to said blank-holders, and means coöperating with said carrier and adapted to introduce and secure a sealing-disk in the cap.

41. In a machine of the character set forth, the combination of a rotary die-plate equipped with a series of dies, means for producing a double-disk blank and delivering the same to one of said dies with the cap-disk received by the die, means coöperating with said dies for down-flanging the cap-disk, means for ring-punching the retainer-ring disk, a folder having a stationary mounting adjacent the periphery of said die-plate and operative to fold the retainer-rings of the blanks on the cap-disks, a rotary carrier having blank-holders adapted to overlie said dies, means operative through said dies to effect transfer of the blanks to said blank-holders, means co-acting with said blank-holders and operative to up-flange the retainer-rings, and means co-acting with said blank-holders and operative to introduce and secure sealing-disks in the cap-disks.

42. In a machine of the character set forth, a rotary die-plate equipped with a series of lower cap-flanging and beading dies, blank-holders encircling said dies, means for elevating said blank-holders with relation to the dies, a female blanking-die above the path of said first-named dies, a coöperating blanking-punch, a cap-flanging and beading punch co-acting with said first-named dies, a stationarily-mounted female ring-piercing die adjacent the periphery of said die-plate, a coöperating ring-piercing punch, a rotary carrier equipped with a series of blank-holders adapted to overlap said first-named dies, means operative through said first-named dies to effect transfer of the blanks to said blank-holders, and means coöperating with said carrier and operative to apply sealing-disks to said cap-disks.

43. In a machine of the character set forth, a rotary die-plate equipped with a series of lower cap-flanging and beading dies, blank-holders encircling said dies, means for elevating said blank-holders with relation to the dies, a female blanking-die above the path of said first-named dies, a coöperating blanking-punch, a cap-flanging and beading punch co-acting with said first-named dies, a stationarily-mounted female ring-piercing die adjacent the periphery of said die-plate, a coöperating ring-piercing punch, a lower tab-beading die adjacent the periphery of said die-plate, a coöperating tab-beading punch, a folder mounted on the frame adjacent the periphery of said die plate, a rotary carrier provided with a series of blank-holders adapted to overlap said first-named dies, blank transferring-plungers operative through said first-named dies and adapted to effect transfer of the blanks to said blank-holders, means coöperating with said carrier and adapted to up-flange the retainer-rings, and means coöperating with said carrier and operative to apply sealing-disks to the cap-disks.

44. In a machine of the character set forth, the combination of a rotary member, means co-acting therewith for forming a cap and surmounting retainer-ring, a secondary rotary member equipped with a series of blank-holders adapted to be presented in axial alinement with the folded blanks, means operative through said first-named rotary member and adapted to transfer the blanks by axial movement to the blank-holders, and means coöperating with said carrier and operative to apply sealing disks to the caps.

45. In a machine of the character set forth, the combination of a rotary member equipped with a series of blank-holders, means for producing a down-flanged cap and a surmounting retainer-ring and, transferring the same in folded condition to one of said blank-holders, a lower ring-flanging die beneath said carrier, a coöperating ring-flanging punch working through the carrier, an annular lower cap-clenching die beneath said carrier, a cork-elevating plunger working through said cap-clenching die, and an upper cap-clenching punch working through said carrier.

46. In a machine of the character set forth, the combination of a rotary die-plate equipped with a series of dies, a reciprocating cross-head equipped with a co-acting punch, a shaft adapted to actuate said cross-head, clutch-mechanism connected with said shaft, and clutch-controlling mechanism comprising a clutch-retracting dog, a spring-actuated plunger controlling the position of said dog, a locking lever normally restraining said plunger from movement against the action of its spring, a die-plate locking plunger movably connected with said cross-head, a cam carried by said cross-head, and a cam-controlled lever carried by said last-named plunger and controlling said locking lever.

47. In a machine of the character set forth, the combination of a rotary disk provided with a series of locking perforations, a reciprocable cross-head, a locking plunger movably connected with said cross-head, a cam carried by said cross-head, a lever carried by said locking plunger and controlled by said cam, a shaft adapted to actuate said cross-head and equipped with a clutch-member retracting dog, and means normally restraining said dog from moving to the retracting position, said means controlled by said cam-controlled lever.

48. The combination with mechanism adapted to form a cap and retainer-ring and surmount the retainer-ring upon the cap, comprising a series of lower cap-flanging dies moving in an annular path, a coöperating upper cap-flanging punch, and means for forming the retainer-ring and surmounting it upon the cap, while the cap is retained on one of said first-named dies, of means for up-flanging the retainer-ring after it has been surmounted on the cap, and means for transferring the cap and surmounting retainer-ring from a first-named die to the ring-flanging means.

49. The combination with mechanism adapted to form a cap and retainer-ring and surmount the retainer-ring upon the cap, comprising a series of lower cap-flanging dies moving in an annular path, a coöperating upper cap-flanging punch, and means for forming the retainer-ring and surmounting it upon the cap, while the cap is retained on one of said first-named dies, of means for transferring the cap and surmounting retainer-ring from a first-named die, and sequentially acting devices receiving the blank therefrom and operative to up-flange the retainer-ring and introduce and secure a seal-disk in the cap.

HARRY MELVILLE BROWN.

In presence of—
CLAYTON F. McKENLY.
FLORENCE L. COOK.

---

Copies of this patent may be obtained for five cents each, by addressing the "Commissioner of Patents Washington, D. C."